United States Patent
Peterson et al.

(10) Patent No.: US 10,616,101 B1
(45) Date of Patent: Apr. 7, 2020

(54) FORWARDING ELEMENT WITH FLOW LEARNING CIRCUIT IN ITS DATA PLANE

(71) Applicant: Barefoot Networks, Inc., Santa Clara, CA (US)

(72) Inventors: Jay Evan Scott Peterson, San Francisco, CA (US); Steven Licking, San Jose, CA (US); Jeongkeun Lee, Mountain View, CA (US); Patrick Bosshart, Plano, TX (US); Anurag Agrawal, Santa Clara, CA (US); Michael Gregory Ferrara, Palo Alto, CA (US)

(73) Assignee: Barefoot Networks, Inc., Santa Clara, CA (US)

( * ) Notice: Subject to any disclaimer, the term of this patent is extended or adjusted under 35 U.S.C. 154(b) by 0 days.

(21) Appl. No.: 15/927,868

(22) Filed: Mar. 21, 2018

Related U.S. Application Data

(60) Provisional application No. 62/474,119, filed on Mar. 21, 2017.

(51) Int. Cl.
*H04L 12/721* (2013.01)
*H04L 12/801* (2013.01)
*H04L 12/851* (2013.01)
*H04L 12/751* (2013.01)

(52) U.S. Cl.
CPC .............. *H04L 45/38* (2013.01); *H04L 45/08* (2013.01); *H04L 47/11* (2013.01); *H04L 47/2483* (2013.01)

(58) Field of Classification Search
CPC ......... H04L 45/38; H04L 45/08; H04L 47/11; H04L 47/2483; H04W 72/042; H04W 72/0446
See application file for complete search history.

(56) References Cited

U.S. PATENT DOCUMENTS

| | | | | |
|---|---|---|---|---|
| 6,006,108 A | * | 12/1999 | Black | H04B 1/406 455/553.1 |
| 7,203,740 B1 | * | 4/2007 | Putzolu | H04L 29/06 709/217 |
| 10,164,829 B1 | * | 12/2018 | Watson | G06F 13/385 |

(Continued)

OTHER PUBLICATIONS

Non-Published commonly Owned U.S. Appl. No. 15/927,723, filed Mar. 21, 2018, 55 pages, Barefoot Networks, Inc.

(Continued)

*Primary Examiner* — Afsar M Qureshi
(74) *Attorney, Agent, or Firm* — Compass IP Law PC

(57) ABSTRACT

Some embodiments provide a data-plane forwarding circuit that can be configured to learn about a new message flow and to maintain metadata about the new message flow without first having a control plane first configure the data plane to maintain metadata about the flow. To perform its forwarding operations, the data plane includes several data message processing stages that are configured to process the data tuples associated with the data messages received by the data plane. In some embodiments, parts of the data plane message-processing stages are also configured to operate as a flow-tracking circuit that includes (1) a flow-identifying circuit to identify message flows received by the data plane, and (2) a first set of storages to store metadata about the identified flows.

20 Claims, 11 Drawing Sheets

(56) References Cited

U.S. PATENT DOCUMENTS

| | | | |
|---|---|---|---|
| 10,298,456 B1* | 5/2019 | Chang | H04L 41/0833 |
| 10,447,597 B1* | 10/2019 | Kim | H04L 47/12 |
| 2004/0095963 A1* | 5/2004 | Rakib | H04J 3/0682 |
| | | | 370/503 |
| 2006/0117126 A1 | 6/2006 | Leung et al. | |
| 2009/0190473 A1 | 7/2009 | Gassewitz et al. | |
| 2011/0085461 A1 | 4/2011 | Liu et al. | |
| 2013/0128746 A1* | 5/2013 | Yedavalli | H04L 45/38 |
| | | | 370/238 |
| 2015/0085694 A1 | 3/2015 | Agarwal et al. | |
| 2015/0100704 A1* | 4/2015 | Davie | H04L 45/16 |
| | | | 709/238 |
| 2016/0277272 A1 | 9/2016 | Peach et al. | |
| 2016/0342510 A1* | 11/2016 | Pani | G06F 12/0615 |
| 2017/0251077 A1 | 8/2017 | Eerpini et al. | |
| 2018/0063087 A1* | 3/2018 | Hira | G06F 15/177 |
| 2018/0262436 A1* | 9/2018 | Thakkar | G06F 9/45558 |

OTHER PUBLICATIONS

Non-Published commonly Owned U.S. Appl. No. 15/927,859, filed Mar. 21, 2018, 54 pages, Barefoot Networks, Inc.

Author Unknown, "Introduction to Cisco IOS NetFlow," White Paper, May 29, 2012, 16 pages, Cisco Systems, Inc.

Author Unknown, "Cisco IOS Flexible NetFlow Technology," Data Sheet, Dec. 2008, 5 pages, Cisco Systems, Inc.

Author Unknown, "NetFlow Monitoring," Cisco UCS Manager CLI System Monitoring Guide, Release 2.2, Jul. 27, 2016, 10 pages, Cisco Systems, Inc.

First Office Action for U.S. Appl. No. 15/927,723, dated Jun. 14, 2019, 12 pages.

First Office Action for U.S. Appl. No. 15/927,859, dated Aug. 20, 2019, 11 pages.

* cited by examiner

FORWARDING ELEMENT WITH FLOW LEARNING CIRCUIT IN ITS DATA PLANE

BACKGROUND

In recent years, certain vendors have discussed providing forwarding elements (e.g., switches, routers, etc.) with flow learning capabilities. Typically, these forwarding elements have their control plane components configure their data plane components to learn about particular flows. A forwarding element's control plane component often provides the interface for configuring the components of the data plane, while the data plane handles the forwarding of the data messages that the forwarding element receives. The data plane is often referred to as the forwarding plane. The data plane often is a custom-made application specific integrated circuit (ASIC) that includes multiple ingress pipelines, multiple egress pipelines, and a switching fabric between the ingress and egress pipelines. The control plane, on the other hand, is typically managed by one or more off-the-shelf processors, which supports the interface for locally or remotely receiving parameters for configuring the forwarding element.

SUMMARY

Some embodiments of the invention provide a data-plane forwarding circuit (data plane) that can be configured to learn about a new message flow and to maintain metadata about the new message flow without first having a local or remote control plane first configure the data plane to maintain metadata about the flow. In some embodiments, the data plane processes data tuples associated with data messages received by the data plane in order to forward the data messages within a network. In some embodiments, the data plane is part of a network forwarding element (e.g., a switch, a router, etc.) that includes a control-plane circuit ("control plane") that configures the data plane. In other embodiments, the control plane that configures the data plane operates outside of the data plane's forwarding element (e.g., operates on a remote server).

To perform its forwarding operations, the data plane includes several data message processing stages that are configured to process the data tuples associated with the data messages received by the data plane. In some embodiments, parts of the data plane message-processing stages are also configured to operate as a flow-tracking circuit that includes (1) a flow-identifying circuit to identify message flows received by the data plane, and (2) a first set of storages to store metadata about the identified flows. The operations of the data plane's message processing stages are configured by a control plane of the data plane's forwarding element in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

In some embodiments, the data plane's flow-identifying message processing circuit includes a data-plane populated mapping storage that, for each identified flow, stores a metadata-storage identifier that specifies a set of locations to store metadata about the identified flow in the first set of storages. In some of these embodiments, the flow-identifying circuit further includes a data-plane populated lean cache storage to identify, for each identified flow, a map-storage identifier that specifies, in the data-plane mapping storage, a storage location that stores the metadata-storage identifier for the identified flow.

For a received message, the flow-identifying message processing circuit first examines the learn cache storage to determine whether the cache storage stores a flow identifier of the received message, which would be indicative of the received message belonging to a previously identified flow. The flow identifier in some embodiments includes one or more header values of the flow's associated message header (e.g., the flow's five tuple identifier), while in other embodiments the flow identifier includes a hash digest generated from the flow's associated message header. Other embodiments specify the flow identifier of the message flow differently.

When the learn cache storage stores the flow identifier of the received message, some embodiments retrieve a map-storage identifier from the learn cache storage for the received message's flow, while other embodiments generate such a map-storage identifier based on the location of the cache storage record that stores the received message's flow identifier. The retrieved or generated map-storage identifier is then used to store, in the first set of storages, metadata that the data plane message processing stages extract from the received data message or generate based on the received data message.

When the learn cache storage does not already store the flow identifier of the received message, the flow-identifying message processing circuit (1) stores the flow identifier in the learn cache storage, (2) specifies a map-storage identifier for the message's flow, (3) specifies a metadata-storage identifier for the message's flow, (4) stores the generated metadata-storage identifier in the mapping storage based on the specified map-storage identifier, and (5) uses the metadata-storage identifier to store metadata in the first set of storages.

In some embodiments, the flow-identifying circuit includes a metadata-storage identifier allocator to allocate a metadata-storage identifier for a received message when the cache storage does not store a flow identifier for the received data message. As mentioned above, the map-storage identifier in some embodiments is defined based on the location of the cache storage record that is used to store (i.e., to learn) the received message's flow identifier. Also, as mentioned above, the map-storage identifier is stored in the learn cache in some embodiments, while it is generated dynamically based on learned cache storage location in other embodiments.

One or more message-processing circuits of the data plane in some embodiments include processing units (e.g., arithmetic logic units, ALUs) to process instructions and memories (e.g., SRAMs) to store state data maintained and used by the processing units. In some of these embodiments, the cache and mapping storages are first and second memories that are written to by first and second processing units of the first and second message-processing circuits of the data plane. To determine whether a received message is part of a previously identified flow, the first processing unit examines the first memory to determine whether the first memory stores the message's flow identifier. To examine the first memory, the first processing unit generates a set of one hash values from the received message's header values, uses this set to identify a set of locations in the first memory, and then determines whether the identified set of locations contain a flow-identifier associated with the received message.

When the first processing unit determines that the first memory stores the message's flow identifier, the first processing unit outputs the map-storage identifier for the message's flow. The second processing unit then examines the second memory (i.e., the mapping storage) to identify the metadata-storage identifier that the second memory stores for the map-storage identifier. In some embodiments, the map-storage and metadata-storage identifiers are addresses in the first and second memories. Also, while the first and second memories are part of two different processing units in some embodiments, these two memories are part of the same processing unit in other embodiments.

As mentioned above, the data plane is part of a network forwarding element that has a local control plane in some embodiments. For some of these embodiments, the flow-tracking circuit includes a set of circuits that publish identifiers of learned flows and their associated data-plane generated metadata-storage identifiers to the control plane of the forwarding element. Based on these identifiers, the control-plane circuit configures a match storage in the data plane to store, in a control-plane optimized manner, the metadata storage identifiers of the learned flows.

For a received message, the flow-identifying circuit uses the message's flow identifier to first search the match storage to determine whether the match storage specifies a metadata-storage identifier for the message's flow. When the match storage does not store a metadata-storage identifier for the received message, the flow-identifying circuit then examines the learn cache and mapping storages to identify the metadata storage identifier or to store a newly specified metadata storage identifier for the received message.

In some embodiments, the data plane repeatedly (e.g., periodically) exports collected flow metadata to the control plane or to a remote controller or server. To do this, the data plane in some embodiments includes a set of message generators that repeatedly generate messages that are fed through the data plane's ingress and egress message processing pipelines to collect flow metadata for exporting to local or remote flow monitoring processes. Each metadata-export message is associated with one or more message processing stages that include one or more metadata storages. A message generator in some embodiments generates each metadata-export message with a set of values that specifically identify some or all of the storage locations in the metadata storage set to read, or that provide enough information from which these locations can be identified by the message processing stages.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF FIGURES

The novel features of the invention are set forth in the appended claims. However, for purposes of explanation, several embodiments of the invention are set forth in the following figures.

DETAILED DESCRIPTION

Figure 1:
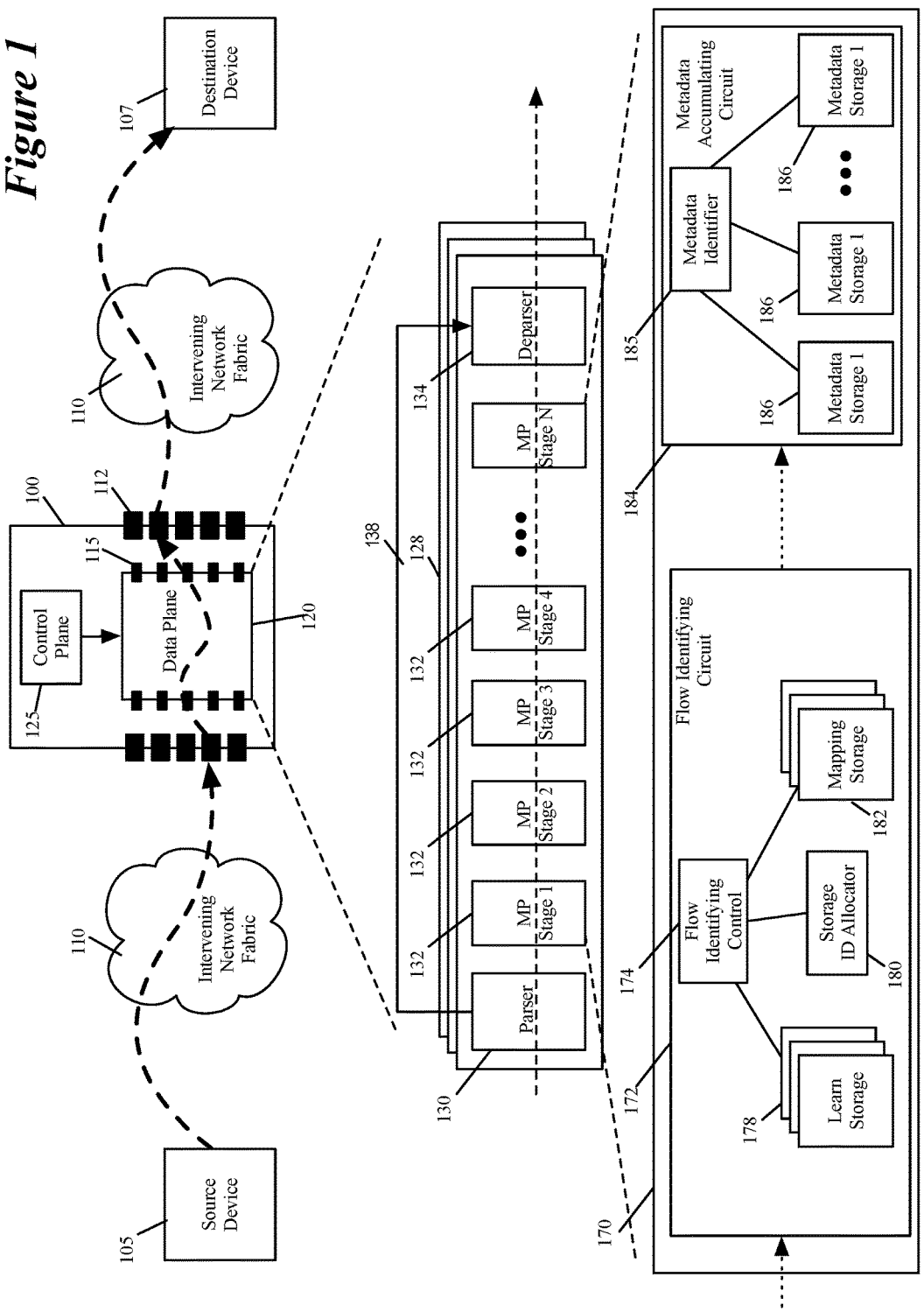
FIG. 1 illustrates a forwarding element of some embodiments that can be configured to learn about a new message flow.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments of the invention provide a data-plane forwarding circuit (data plane) that can be configured to learn about a new message flow and to maintain metadata about the new message flow without first having a local or remote control plane first configure the data plane to maintain metadata about the flow. In some embodiments, the data plane processes data tuples associated with data messages received by the data plane in order to forward the data messages within a network. In some embodiments, the data plane is part of a network forwarding element (e.g., a switch, a router, etc.) that includes a control-plane circuit ("control plane") that configures the data plane. In other embodiments, the control plane that configures the data plane operates outside of the data plane's forwarding element (e.g., operates on a remote server).

To perform its forwarding operations, the data plane includes several data message processing stages that are configured to process the data tuples associated with the data messages received by the data plane. In some embodiments, parts of the data plane message-processing stages are also configured to operate as a flow-tracking circuit that includes (1) a flow-identifying circuit to identify message flows received by the data plane, and (2) a first set of storages to store metadata about the identified flows. The operations of the data plane's message processing stages are configured by a local or remote control plane of the data plane's forwarding element in some embodiments. In some embodiments, a local control plane is implemented by a control software layer that is executed by one or more general purpose processors (e.g., CPUs) of the forwarding element, while a remote control plane is implemented by control software layer executing by one or more CPUs of another forwarding element or a remote computer (e.g., server).

As used in this document, data messages refer to a collection of bits in a particular format sent across a network. One of ordinary skill in the art will recognize that the term data message may be used herein to refer to various formatted collections of bits that may be sent across a network, such as Ethernet frames, IP packets, TCP segments, UDP datagrams, etc. Also, as used in this document, references to L2, L3, L4, and L7 layers (or layer 2, layer 3, layer 4, and layer 7) are references respectively to the second data link layer, the third network layer, the fourth transport layer, and the seventh application layer of the OSI (Open System Interconnection) layer model.

FIG. 1 illustrates an example of a forwarding element 100 with a data plane circuit 120 that can be configured to learn about a new message flow and to maintain metadata about the new message flow without first having a local or remote control plane first configure it to maintain metadata about the flow. The forwarding element 100 forwards data messages within a network 110. The forwarding element 100 can be any type of forwarding element, such as a switch, a router, a bridge, etc.

In FIG. 1, the forwarding element is deployed as a non-edge forwarding element in the interior of the network to forward data messages from a source device 105 to a destination device 107. In other cases, this element 100 is deployed as an edge forwarding element at the edge of the network to connect to compute devices (e.g., standalone or host computers) that serve as sources and destinations of the data messages. As a non-edge forwarding element, the forwarding element 100 forwards data messages between forwarding elements in the network (i.e., through intervening network fabric 110), while as an edge forwarding element, the forwarding element forwards data messages to and from edge compute devices to each other, to other edge forwarding elements and/or to non-edge forwarding elements.

As shown, the forwarding element 100 includes (1) a data plane circuit 120 (the "data plane") that performs the forwarding operations of the forwarding element 100 to forward data messages received by the forwarding element to other devices, and (2) a control plane circuit 125 (the "control plane") that configures the data plane circuit. The forwarding element 100 also includes physical ports 112 that receive data messages from, and transmit data messages to, devices outside of the forwarding element 100. The data plane circuit 120 includes ports 115 that receive data messages to process and to transmit data messages after they have been processed. Some ports 115 of the data plane 120 are associated with the physical ports 112 of the forwarding element 100, while other ports 115 are associated with other modules of the data plane 120.

The data plane includes several configurable (i.e., programmable) message-processing stages 132 that can be configured to perform the data-plane forwarding operations of the forwarding element 100 to process and forward data messages to their destinations. These message-processing stages perform these forwarding operations by processing data tuples (e.g., message headers) associated with data messages received by the data plane 120 in order to determine how to forward the messages.

As further described below, these message-processing stages 132 can also be configured to operate as a flow-tracking circuit 170 that includes (1) a flow-identifying circuit 172 to identify message flows received by the data plane, and (2) a metadata accumulating circuit 184 to store in a set of storages 186 metadata about the identified flows. As further described below, the message-processing stages in some embodiments include match-action units (MAUs) that try to match data tuples (e.g., header vectors) of messages with table records that specify action to perform on the data tuples.

The configurable message-processing circuits 132 are grouped into multiple message-processing pipelines 128. As further described below by reference to FIG. 3, the message-processing pipelines can be ingress or egress pipelines before or after the forwarding element's traffic management stage that serves as a crossbar switch that directs messages from the ingress pipelines to egress pipelines.

Each pipeline includes a parser 130, several message-processing stages 132, and a deparser 134. A pipeline's parser 130 extracts a message header from a data message that the pipeline receives for processing. In some embodiments, the extracted header is in a format of a header vector (HV) that is processed, and in some cases modified, by successive message processing stages 132 as part of their message processing operations. The parser 130 of a pipeline passes the payload of the message to the deparser 134 as the pipeline's message-processing stages 132 operate on the header vectors. In some embodiments, the parser also passes the message header to the deparser 134 along with the payload (i.e., the parser passes the entire message to the deparser).

When a pipeline 128 finishes processing a data message and the message has to be provided to the traffic management stage (in case of an ingress pipeline) or to a port 115 (in case of an egress pipeline) to be forwarded to the message's next hop (e.g., to its destination compute node or next forwarding element), a deparser of the pipeline in some embodiments produces the data message header from the message's header vector that was processed by the pipeline's last message processing stage, and combines this header with the data message's payload. In some embodiments, the deparser 134 uses part of the header received form the parser 130 to reconstitute the message from its associated header vector.

In some embodiments, one or more message-processing stages 132 of each ingress pipeline are configured to implement the flow-identifying circuit 172 and the metadata accumulating circuit 184. The flow-identifying circuit 172 examines each message processed by its pipeline to determine whether it has previously identified that message's flow. In other embodiments, the flow-identifying circuit 172 only examines each message that has not been filtered out for flow-identification by an earlier flow-filter operation, as further described below.

When the flow-identifying circuit 172 identifies a message as being part of a previously identified flow, the flow-identifying circuit 172 stores in the message's associated header vector a metadata-storage identifier that specifies a set of metadata storage locations 186 that the subsequent metadata accumulating circuit 184 should use to store metadata about the message's flow based on analysis of the message. For each message that is part of a flow that the flow-tracking circuit 170 has to track, the flow-identifying circuit 172 in some embodiments stores a value (e.g., a flag) in the message's associated header to specify that the metadata accumulating circuit 184 has to track and store metadata about this message as this message is part of a message flow that is being tracked.

As shown, the flow-identifying circuit 170 includes a set of one or more cache storages 178, a storage ID allocator 180, a set of one or more mapping storage 182, and a flow-identifying control 174. The mapping storage set 182 is a data-plane populated set of storages that store, for each identified flow, a data-plane assigned metadata-storage identifier that specifies the set of locations in the metadata storages 186 in which a metadata identifying circuit 185 of the metadata accumulating circuit 184 can store metadata about an identified flow.

The metadata identifying circuit 185 stores at these locations metadata that it (i.e., the set of data plane message processing stages that implement the metadata accumulating circuit 184) extracts from the received data message and/or generates based on the received data message. Examples of such metadata include attributes stored in the message headers (e.g., MAC addresses, five-tuple identifiers, etc.), timestamps for flow learn/age events, statistics for each flow (e.g., number of processed messages in each flow, average payload size of the messages in a flow, overall size of message payloads in each flow, etc.), source and destination port numbers, etc. In some embodiments, the metadata identifier includes circuits (e.g., counters) that generate metadata regarding the learned flows (e.g., count number for the messages in a learned flow).

To learn new message flows in the data plane, the flow-identifying circuit 172 includes the data-plane populated learn cache storage 178. The learn cache storage 178 (1) stores flow identifiers that identify flows previously identified by the flow identifying circuit, and (2) for previously identified flows, specifies map-storage identifiers that identify storage locations in the mapping storage 182 that store the metadata-storage identifiers for the identified flows. The flow identifier for a message flow in some embodiments includes one or more header values of the flow's associated message header (e.g., the flow's five tuple identifier), while in other embodiments the flow identifier includes a hash digest generated from the flow's associated message header. Other embodiments specify the flow identifier of the message flow differently. As further described below, the learn cache specifies map-storage identifiers by in some embodiments dynamically generating them based on the storage locations of the flow identifiers, or in other embodiments retrieving the map-storage identifier from storage records associated with the stored flow identifiers.

In some embodiments, the flow-identifying circuit 172 uses the metadata-storage identifier allocator to allocate a metadata-storage identifier for a received message when the cache storage does not store a flow identifier for the received data message. Specifically, for a received message, the flow-identifying control 174 first examines the learn cache storage 178 to determine whether the cache storage stores a flow identifier of the received message, which would be indicative of the received message belonging to a previously identified flow. As further described below, the flow-identifying control 174 is a conceptual representation of the operations performed by the data plane message processing stages that implement the flow-identifying circuit.

When the learn cache storage does not already store the flow identifier of the received message, the flow-identifying control 174 (1) stores the flow identifier in the learn cache storage 178, (2) specifies a map-storage identifier for the message's flow, (3) specifies a metadata-storage identifier for the message's flow, (4) stores the generated metadata-storage identifier in the mapping storage 182 based on the specified map-storage identifier, and (5) provides the metadata-storage identifier to the metadata accumulating circuit 184 to store metadata in the metadata storages 186.

On the other hand, when the learn cache storage 178 already stores the flow identifier of the received message, the flow-identifying control 174 in some embodiments retrieves a map-storage identifier from the learn cache storage for the received message's flow. In other embodiments, the flow-identifying control 174 generates the map-storage identifier based on the location of the learn cache storage record that stores the received message's flow identifier. The flow-identifying control uses the retrieved or generated map-storage identifier to retrieve the metadata-storage identifier from the map storage 182, and then provides (in a header vector) the metadata-storage identifier to the metadata accumulating circuit 184 to store metadata in the metadata storages 186.

Figure 2:
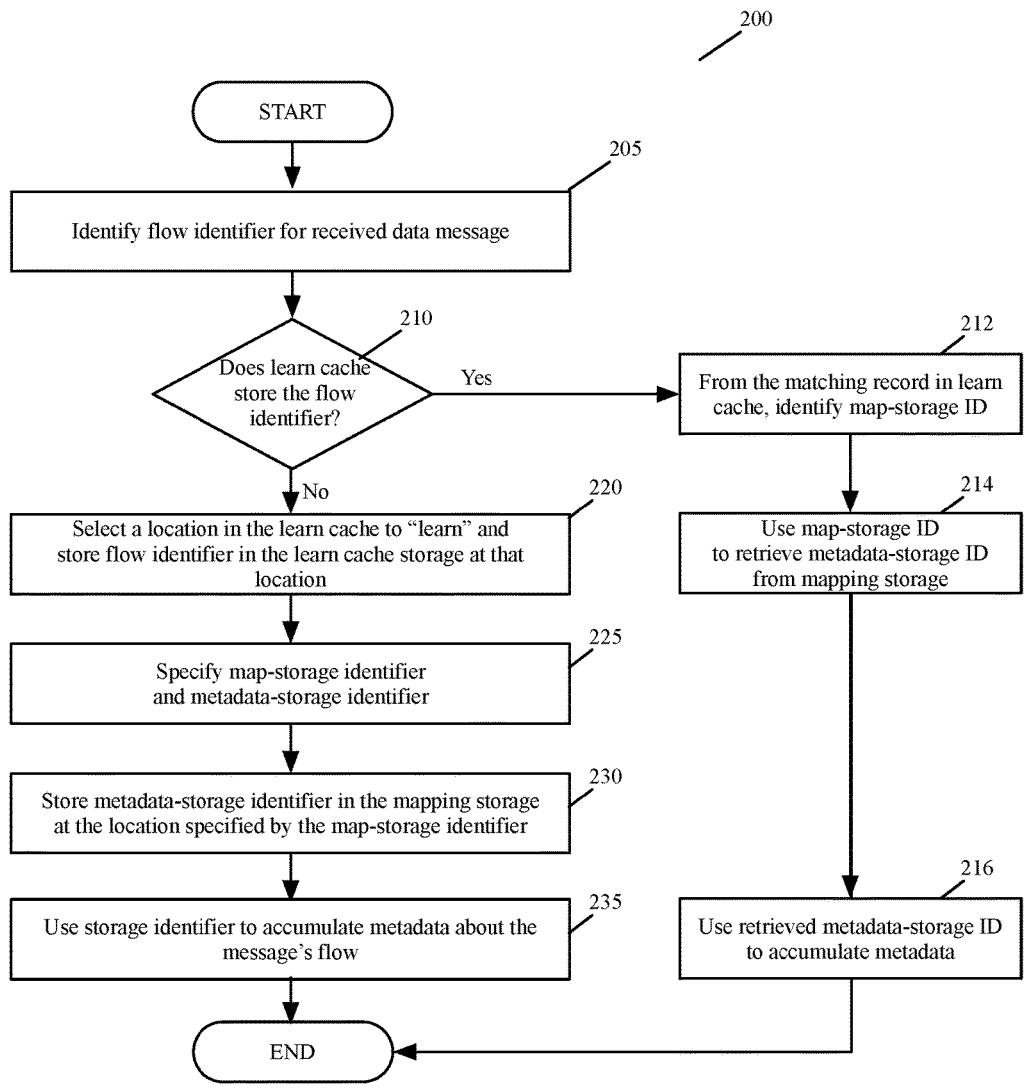
FIG. 2 illustrates a flow-identifying process of some embodiments.

FIG. 2 provides a conceptual illustration of a process 200 that the flow-identifying control 174 performs in some embodiments. This process is collectively performed by the message processing stages that implement the flow-identifying circuit 172. This process is performed for each received data message that has to be examined by the flow-identifying circuit 172.

As shown, the flow-identifying process 200 initially identifies (at 205) a flow identifier for a received message. The flow identifier for the received message in some embodiments includes one or more header values of the flow's associated message header, e.g., the flow's five tuple identifier, which are source and destination IP address, source and destination ports, and protocol. In other embodiments the flow identifier is a hash digest generated from the flow's associated message header. In some embodiments, the message processing stages include hash generators, and one of these generators produces the hash digest for the received message from the message's header values (e.g., its five tuple identifier). Other embodiments specify the flow identifier of the message flow differently.

The flow-identifying process 200 then determines (at 210) whether the learn cache storage 178 stores the flow identifier that was identified for the received message at 205. The storage of this identifier would be indicative of the received message belonging to a previously identified flow. Different embodiments use different types of cache storages to learn flow identifiers. In some embodiments, the learn cache storage is a modified D-way learn cache storage that has D possible storage locations for each received data message. For instance, in some embodiments, D hash generators are used in the set of message processing stages that implement the learn cache. These D hash generators produce D hash values from the received message's header values (e.g., its five tuple identifier). These D hash values are then used to identify D storage locations in the D-way learn cache. These D locations are then examined to determine whether any of them stores the flow identifier specified for the received message at 205. If none of them store the flow identifier, each of these D locations is a candidate for learning but one or more of them might already be used to learn about one or more other flows.

As further described below, the learn cache 178 is a D-Left learn cache with the D storage locations (for a flow) having different priority levels. In such a cache, a higher priority location might not be available for learning for a same flow at a particular time (e.g., another flow has mapped to that location and has its flow identifier stored at that location). Accordingly, in such a case, the received data message's flow identifier has to be stored in a lower priority storage location in the D-Left learn cache. When the higher priority location subsequently become available for another data message in the same flow as the received data message, the learn cache in some embodiments resets the lower priority location at which it previously recorded the flow identifier, and stores this flow identifier at the higher priority location. This movement of the learning from a lower priority location to a higher priority location in some embodiments is only performed when the learn cache is implemented by multiple message processing stages, and an earlier processing stage ends up learning about a flow after a later processing stage initially learns about the flow, as further described below.

When the flow-identifying process 200 determines that the learn cache storage 178 stores the flow identifier identified at 205 (e.g., determines that one of the N-way learn cache locations stores this flow identifier), the process 200 specifies (at 212) a map-storage identifier from the learn cache storage for the received message's flow. Some embodiments store this map-storage identifier in the learn cache. In these embodiments, the process retrieves (at 212) the map-storage identifier from the learn cache storage for the received message's flow. In other embodiments, the flow-identifying process 200 dynamically generates (at 212) the map-storage identifier based on the location (e.g., the way stage and address of the location of the record in the stage) of the learn cache storage record that stores the received message's flow identifier.

Next, at 214, the flow-identifying process 200 uses the retrieved or generated map-storage identifier to retrieve the metadata-storage identifier from the map storage 182. The map-storage identifier in some embodiments identifies a storage location in the map storage that stores the metadata-storage identifier to retrieve. The flow-identifying process 200 provides (at 216) the metadata-storage identifier to the metadata accumulating circuit 184, which this circuit then uses to identify storage locations in the metadata storages 186 to store metadata that it extracts or generates for the received data message.

In some embodiments, the flow-identifying process 200 provides the metadata-storage identifier by storing this identifier in the header vector that the data message processing stages process for the received data message. The flow-identifying process 200 also stores other parameters in the header vectors in order to assist in its flow-identifying operations. For instance, when the learn cache (e.g., D-Left cache) is implemented by two or more message-processing stages 132, the flow-identifying process 200 also stores in the header vector learn-cache parameters of earlier message processing stages that are needed by later message processing stages, as further described below. After 216, the process 200 ends.

When the flow-identifying process 200 determines (at 210) that the learn cache storage 178 does not store the flow identifier identified at 205, the received message is treated as belonging to a newly identified flow. Hence, the flow-identifying process stores (at 220) the flow identifier in the learn cache storage 178 at a location that is derivable from the received message flow attributes. For instance, in some embodiments, the address for this location is a hash value that is produce by applying a hash function to the received message's five tuple identifier.

In the embodiments where the learn cache is a D-way cache, the message's flow attributes (e.g., its five tuple identifier) are supplied to D hash generators that produce D hash values from these attributes, and these D hash values are used to identify D storage locations in the D-way learn cache. When the process 200 determines (at 210) that none of these storage locations stores the flow identifier associated with the received data message, the process 200 stores (at 220) the message's flow identifier in one of the D storage locations that has the highest priority and that is available (i.e., that is not currently used for another learned flow).

After 220, the process specifies (at 225) a map-storage identifier for the message's flow. In some embodiments, the process generates the map-storage identifier based on the location of the learn cache storage that it used to store the received message's flow identifier. In other embodiments, the learn cache storage 178 stores a map-storage identifier with the flow identifier of the received message, and the process retrieves the map-storage identifier from the learn cache storage for the received message's flow. At 225, the process directs the storage ID allocator 180 to allocate a metadata-storage identifier for the message's flow. The process then provides (at 225) the map-storage identifier and the allocated metadata-storage identifier to the mapping storage 182. The mapping storage 182 then stores (at 230) the generated metadata-storage identifier at a location identified by the map-storage identifier.

In some embodiments, different stages of the learn cache and the mapping storage are implemented in the same message processing stages and a learn cache stage can directly provide its output to its corresponding mapping stage. In other embodiments, however, the learn cache 178 and the mapping storage 182 are implemented by stateful ALUs (and their associated stateful storages) in different message processing stages. Accordingly, to provide the map-storage identifier to the mapping storage 182, the process 200 in some embodiments has the learn-cache implementing set of one or more message processing stages store this identifier in the message's associated header vector so that this identifier can reach the set of one or more message processing stages that implement the mapping storage 182. Similarly, in the embodiments where the storage ID allocator 180 and the mapping storage are implemented by different message processing stages, the allocated metadata-storage ID is stored in the message's header vector so that it can reach the stage that implements the mapping storage.

At 235, the process 200 provides the metadata-storage identifier to the metadata accumulating circuit 184, which then uses this identifier to identify storage locations in the metadata storages 182 at which it can store metadata that it extracts or generates for the received data message. In some embodiments, the flow-identifying process 200 stores the metadata-storage identifier in the header vector associated with this message, so that the set of message processing stages that implement the metadata accumulating circuit 184 can extract this storage identifier from the header vector when the header vector reaches this set.

The metadata accumulator circuit 184 of the data plane is implemented by multiple message processing stages 132 in some embodiments. This circuit maintains metadata about each message flow that the flow tracking circuit 170 tracks. This circuit has a metadata identifier 185 that identifies metadata for a message that has to be tracked (e.g., is marked for tracking by the flow-identifying control 174), and stores this metadata in one or more metadata storages 186 at locations specified by the metadata-storage identifier that the flow-identifying circuit 172 specifies for the message.

In some embodiments, the metadata identifier is implemented by one or more MAUs of one or more message processing stages 132. Examples of metadata that the metadata identifier 185 can track for a message flow while the data plane 120 of the forwarding element 100 processes that flow's messages are: message header values (e.g., MAC (media access control), five tuple identifiers, any other value extracted from the message header or payload and placed in the processed header vector of the message, etc.), counters and flags associated with the messages, average delay experienced by the messages, average queue depth experienced by the messages, byte count of the message payloads (e.g., average byte count), or any other metadata tracked by existing flow tracking techniques.

In some embodiments, the data-plane, flow-tracking circuit 170 repeatedly (e.g., periodically) exports to the control plane or to a remote controller or server the metadata that it stores for different identified flows in the metadata storages 186. To do this, the data plane in some embodiments includes a set of message generators that repeatedly generate messages that are fed through the data plane's ingress and egress message processing pipelines to collect flow metadata for exporting to local or remote flow monitoring processes, as further described below by reference to FIG. 6.

Also, in some embodiments, the flow-tracking circuit includes a set of circuits that publish to its forwarding-element control plane the metadata-storage identifiers and their associated flow identifiers that are stored in the mapping storage. The flow-tracking circuit in some embodiments retrieves these values from the mapping storage, while in other embodiments these values are retrieved from a storage-ID log, as further described below.

Based on published metadata-storage and flow identifiers, the control plane populates a match storage in the data plane to store, in a control-plane optimized manner, the metadata-storage and flow identifiers that the publishing circuit set publishes to the control plane. For a received message, the flow-identifying circuit uses the message's flow identifier to first search the match storage to determine whether the match storage specifies a storage identifier for the message's flow. When the match storage does not store a storage identifier for the received message, the flow-identifying circuit then examines the learn cache and mapping storages to identify the metadata-storage identifier or to store a newly generated metadata-storage identifier for the received message.

Figure 3:
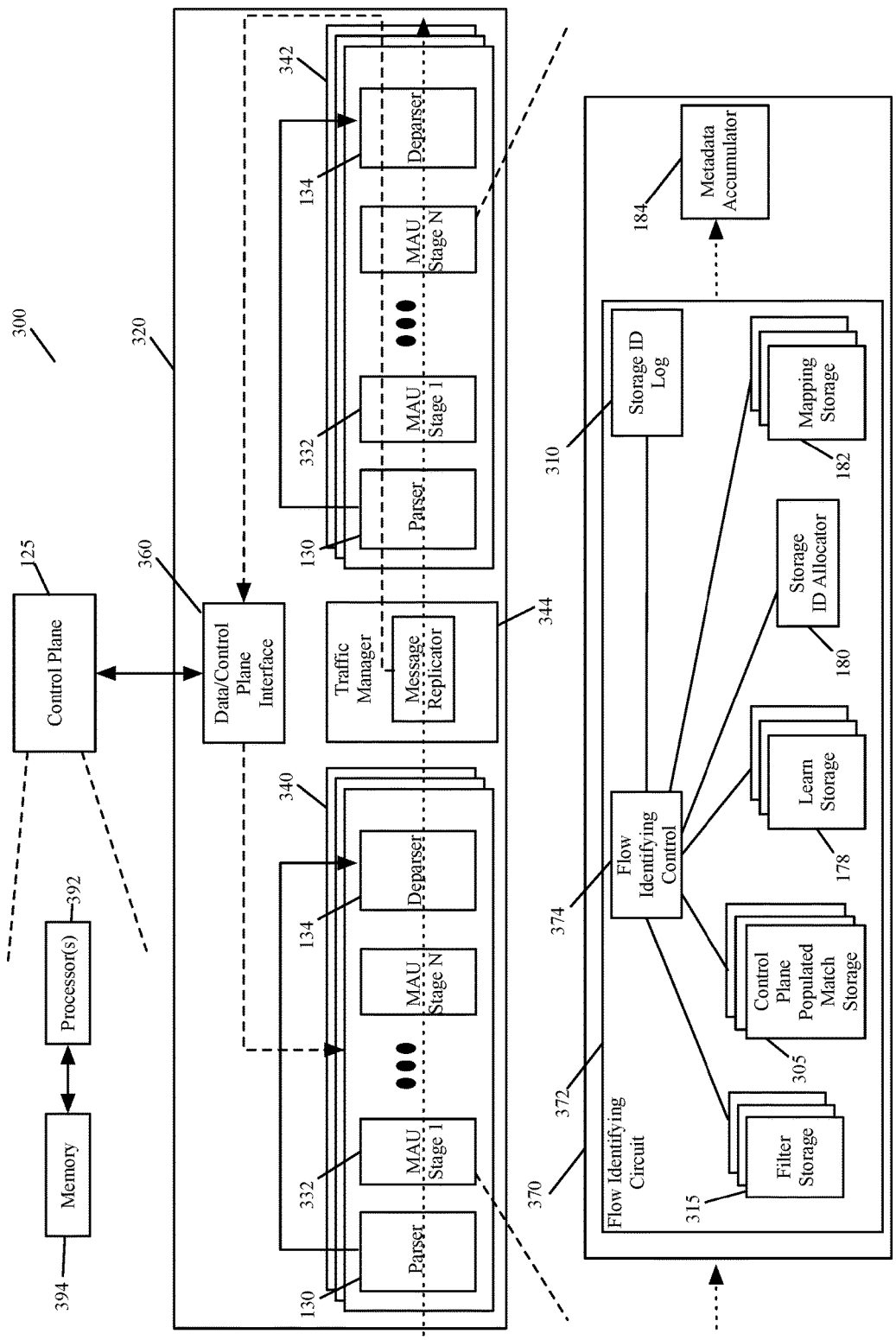
FIG. 3 illustrates another forwarding element of some embodiments that can be configured to learn about a new message flow.

FIG. 3 illustrates a forwarding element 300 that has a data-plane flow-identifying circuit 372 that includes a set of control-plane populated match storages 305 to store data-plane assigned storage identifiers of message flows that the data plane's flow-identifying circuit 372 previously identified. The flow-identifying circuit is similar to flow-identifying circuit 172 of FIG. 1, except that the flow-identifying circuit 372 includes the control-plane populated match storage set 305, a storage ID log 310, and a filter storage set 315.

In some embodiments, the filter storage set 315 stores one or more records that identify one or more types of flows that the flow-tracking circuit 370 does not need to identify and track. The control plane 125 populates these records in some embodiments. The flow-identifying control 374 checks these records to pre-process each message that the data plane 320 receives, and based on these checks, sets a No_Learn flag in the header vector of any message that should not be analyzed by the flow-identifying circuit for flow identification. This filtering is meant to eliminate message flows that are of no interest in the flow learning.

In other embodiments, the records in the filter storage set 315 identify one or more types of flows that the flow-tracking circuit 370 should identify and track. In these embodiments, the flow-identifying control 374 checks these records to pre-process each message that the data plane 320 receives, and based on these checks, sets a Learn flag in the header vector of any message that should be analyzed by the flow-identifying circuit for flow identification. In some embodiments, both these types of filtering operations are not specifying any particular flow, but specify a class of flows that should be marked for ignoring or including in the flow learning.

In this manner, the control plane 125 does not configure the filter storage set for any particular flow, but rather stores filter records identifying classes of flows for exclusion or inclusion in the flow learning. Examples of types of flows that can be filtered out of the flow learning or included in the flow learning include flows associated with different tenants in a multi-tenant datacenter (e.g., flows with different virtual network identifiers in their headers), flows from different source machines, flows to different destination machines, flows using particular layer ports, flows using particular protocols, etc.

The storage ID log 310 in some embodiments stores data-plane assigned metadata-storage identifiers of the data-plane identified flows along with their associated flow identifiers. In some embodiments, the storage ID log also stores other data (e.g., statistics regarding the different learned flows) that the control plane needs in order to populate the learned flows into the control-plane populated match storage 305. In some embodiments, these identifiers are stored in the log 310 after the process 200 specifies the metadata-storage identifier at 225. Also, in some embodiments, once this log has reached a threshold number of records of learned flows, an interrupt signal is sent to the control plane in order to notify the control plane that it needs to retrieve records for the newly identified flow from the storage ID log 310. Once notified, the control plane in some embodiments (1) retrieves the records from the storage ID log 310 through a data/control plane interface 360, and (2) resets this log to empty its records. In some embodiments, the storage ID log 310 is implemented as a push/pop stack, as further described below. In some of these embodiments, the control plane directs the data plane to perform pop operations (e.g., reset counters) after it retrieves records from the stacks that implement the storage ID log.

In other embodiments, the control plane retrieves the storage ID log by directing a message generator in the data plane to generate messages that are populated by the message processing stages with the content of the storage log, and these messages are then directed to the control plane through the data/control plane interface 360 and an egress port 115 that is associated with this interface. In still other embodiments, a storage ID publisher in the data plane periodically publishes the metadata-storage identifiers and their associated flow identifiers to the control plane 125 (e.g., through messages generated by the message generator and routed to the interface 360 through its corresponding egress port 115). In yet other embodiments, the storage ID publisher publishes to the control plane each message's metadata-storage identifier and flow identifier individually after the metadata-storage identifier has been assigned for the message's flow by the storage ID allocator 180.

FIG. 3 illustrates that the data plane 320 of the forwarding element includes multiple ingress pipeline stages 340, multiple egress pipeline stages 342, and a traffic management stage 344. Each pipeline stage 340 or 342 is similar to a pipeline 128 of FIG. 1. The message processing stages in this example are match-action units (MAUs) 332. As shown in FIG. 3, the flow-tracking circuit 370 is implemented by the configurable (i.e., programmable) MAUs 332 of the ingress and egress pipelines 340 and 342 and the traffic manager 344.

In some embodiments that individually publish data-plane assigned metadata-storage identifiers (and their associated flow identifiers) to the control plane 125, the flow-identifying circuit 372 sets a Publish flag the header vector of a message after this message is identified as a first message of a newly learned flow and a storage identifier is allocated to this newly learned flow. This flag specifies that this message is associated with a newly allocated storage identifier. This flag directs a message replicator of a traffic manager to replicate the message and direct the replicated version to an egress port 115 that is associated with a data-plane/control-plane interface 360 of the data plane 320. Messages that are directed to this egress port are stored in a storage (e.g., a register) of the interface 360. The control plane 125 retrieves data stored in this storage periodically or based on generated interrupts.

Other embodiments publish in batch data-plane assigned metadata-storage identifiers and their associated flow identifiers to the control plane 125, in order to avoid data plane congestion due to the replicated messages and to reduce the number of control plane retrievals and/or interrupts. As mentioned above, the batch publication in some embodiments is facilitated by the storage-ID log 310. In some of these embodiments, the control plane can directly read this log (e.g., after receiving an interrupt once this log stores a threshold number of records) in some embodiments. In other embodiments, the control plane receives the content of this log from one or more messages that a data plane message generator generates and the message processing stages populate with the content log. In some embodiments, the ingress processing stages address these messages to the egress port 115 associated with the control plane 125, which then forwards these messages to the data/control plane interface 360 from where the control plane retrieves them. In some embodiments, the message generator periodically generates such messages, while in other embodiments, the message generator generates such messages after the control plane receives an interrupt message that specifies that the log 310 has reached its threshold and the control plane directs the message generator to generate messages to read out the content of the log 310.

As mentioned above, the control plane 125 configures the data plane 320. In some embodiments, the control plane includes (1) one or more processors 392 (such as a microprocessor with multiple processing cores or units) that execute instructions, and (2) a memory 394 that stores instructions for processes that when executed by the processors 392 perform the control plane operations. These instructions can be specified by (1) a manufacturer of the network forwarding element that includes the control and data planes 125 and 360, (2) a network administrator that deploys and maintains the network forwarding, or (3) one or more automated processes that execute on servers and/or network forwarding elements that monitor network conditions. A processor 392, or another circuit of the control plane, communicates with the data plane (e.g., to configure the data plane or to receive statistics from the data plane) through the interface 360.

One of the sets of instructions (i.e., one of the programs) in the memory 394 that a processor 392 of the control plane 125 periodically executes in some embodiments identifies an optimal storage of the data-plane storage identifiers in the match storage 305. For instance, in some embodiments, the processor executes a cuckoo hashing program that identifies an optimal way of storing the metadata-storage and flow identifiers in the match storages 305 to be able to tightly pack these records to store more such records, to reduce hash collisions and to quickly identify the metadata-storage identifiers for the most frequently processed message flows. To do this operation, the control plane in some embodiments collects from the data plane metadata about the identified flows (e.g., statistics regarding number of messages encountered in each flow). The collection of such metadata will be explained further below.

In some embodiments, the control plane stores in the match storage 305 the same flow identifiers for the learned flows as the flow identifiers that are stored in the learned storage 178 and the storage ID log 310. In match storage 305, the control plane in other embodiments stores flow identifiers for the learned flows that are different than the flow identifiers that are stored for these flows in the learned storage 178 and the storage ID log 310.

Figure 4:
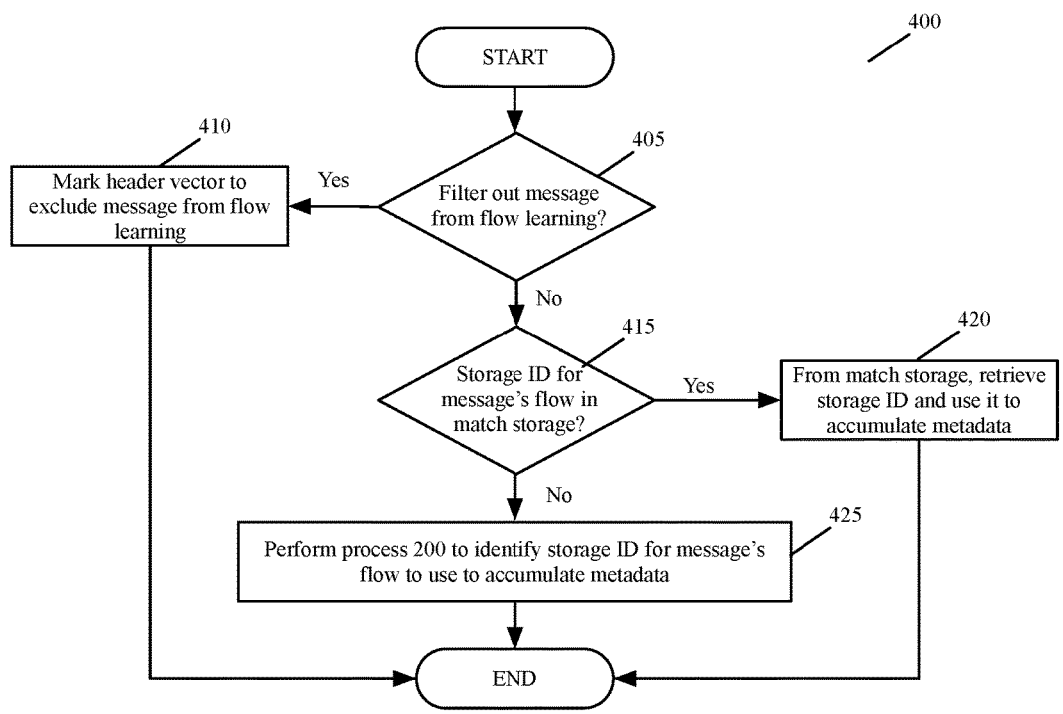
FIG. 4 illustrates another flow-identifying process of some embodiments.

FIG. 4 presents a process 400 that conceptually illustrates a series of operations that the flow-identifying control 374 performs for each message processed by the data plane 320. Like flow-identifying process 200, the flow-identifying process in some embodiments is a conceptual representation of the operations performed by message processing stages that implement the flow-identifying circuit 372. This process is performed for each received data message that has to be examined by the flow-identifying circuit 372.

As shown, the process 400 initially determines (at 405) whether a record in the filter storage set 315 specifies that the received message should be excluded from the flow learning. To do this check, the process 400 in some embodiments compares the header values of the received message (as expressed in the header vector being processed by a message processing stage that implements the filter logic) with the match identifiers of the filter records, in order to determine whether the message's header values matches one of the records.

When the received message matches one of the filter records, the process 400 sets (at 410) a No_Learn flag in the received message's header vector so that subsequent flow-identifying control operations ignore this message for flow identification and tracking. After 410, the process 400 ends. As mentioned above, the filtering operation in other embodiments identifies classes of flows that should be included in the flow learning, as opposed to identifying classes of flows that should be excluded from the flow learning.

When the received message does not match (at 405) one of the filter records in the filter storage set 315, the process 400 determines (at 415) whether the control-plane populated match storage set 305 stores a storage identifier for the message's flow. To do this check, the process 400 in some embodiments specifies a flow identifier for the received message (e.g., designated the message's five-tuple identifier or generates a hash digest from the received message's header values) and compares this flow identifier with match identifiers of the records in the match storage 305, in order to determine whether the message's flow matches one of these records.

When the received message matches (at 415) one of the match records, the process 400 retrieves (at 420) the metadata-storage identifier from the identified match record and stores (at 420) the retrieved metadata-storage identifier in the message's header vector. The flow-tracking circuit's metadata accumulator circuit 184 then uses this storage identifier to identify storage locations for storing, retrieving and updating metadata records associated with the message's flow based on the processing of the received message. After 420, the process ends.

On the other hand, when the received message does not match (at 415) one of the match records in the match storage set 305, the process 400 transitions to 425 to perform the flow-identifying process 200 of FIG. 2. The process 200 then either allocates a new metadata-storage identifier for the message when this message is part of a newly identified flow, or retrieves a previously assigned metadata-storage identifier for this message when this message is part of a previously identified flow that has not yet had its metadata-storage identifier stored in the match storage 305 by the control plane. After 425, the process 400 ends.

One or more message-processing circuits of the data plane in some embodiments include processing units (e.g., ALUs) to process instructions and stateful memories (e.g., SRAMs) to store state data maintained and used by the processing units. In some of these embodiments, the cache and mapping storages 178 and 182 are first and second memories that are written to by first and second processing units of the same or different message-processing circuits of the data plane. To determine whether a received message is part of a previously identified flow, the first processing unit examines the first memory to determine whether the first memory stores the message's flow identifier for the cache identifier generated for the received message. When the first processing unit determines that the first memory stores the message's flow identifier for the generated cache identifier, the second processing unit examines the second memory to identify the storage identifier that the second memory stores for the cache identifier. In some embodiments, the cache and storage identifiers are addresses in the first and second memories.

Figure 5:
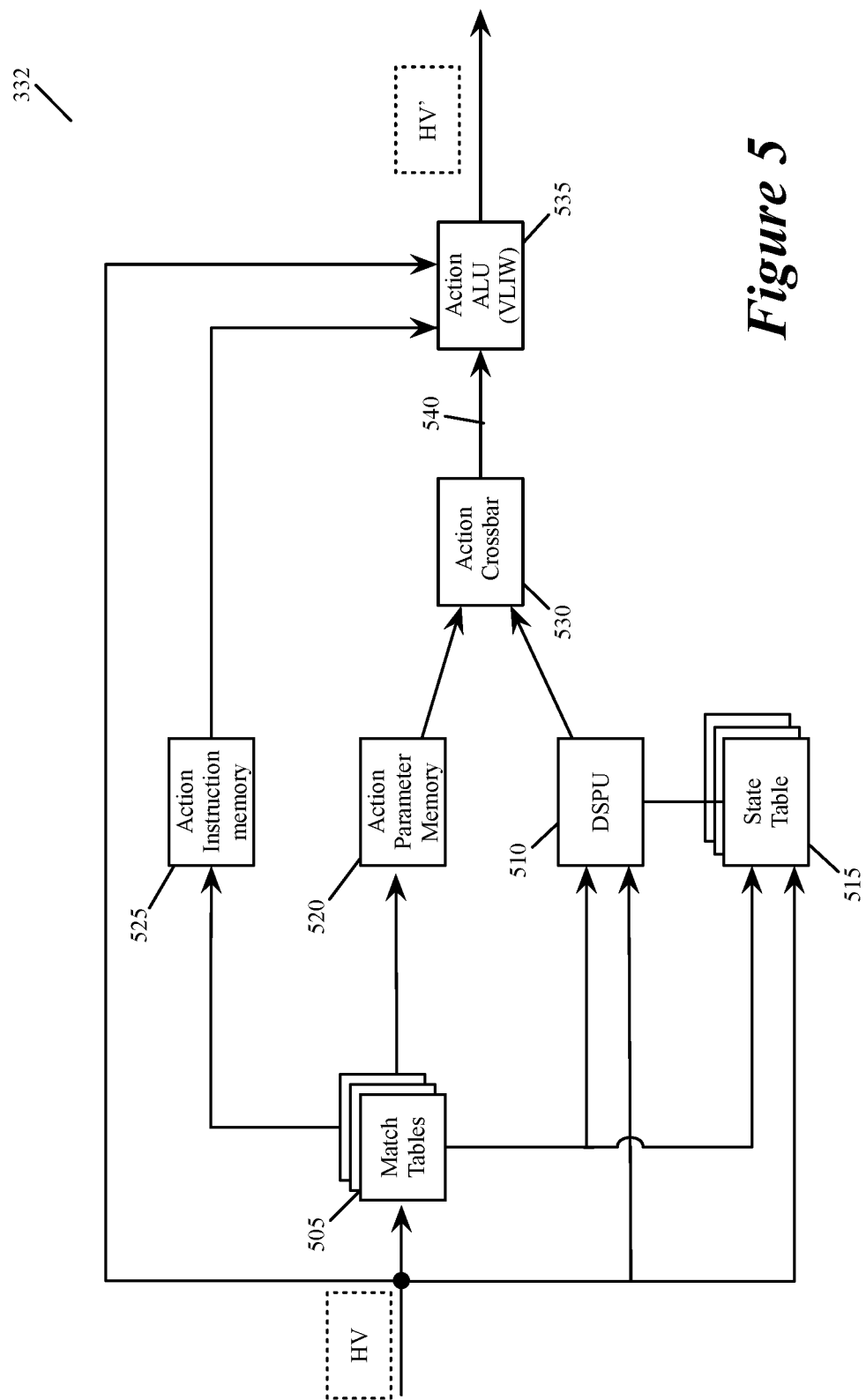
FIG. 5 illustrates examples of stateful memories and processing units that some embodiments use in a message-processing stage of a data plane of the forwarding element of some embodiments.

FIG. 5 illustrates examples of stateful memories and processing units that some embodiments use in a match action unit 332 to implement the various components of the flow-tracking circuit 370 (e.g., the flow-identifying control 174, the match storage 305, the learn cache storage 178, the mapping storage 182, the storage ID allocator 180, the storage ID log 310, and the metadata accumulator 184). As mentioned above, an ingress pipeline 340 or egress pipeline 342 in some embodiments has several MAU stages 332, each of which includes message-processing circuitry for forwarding received data messages and/or performing stateful operations based on header vectors associated with the data m. In some embodiments, the control plane 125 of the forwarding element 300 or a remote control plane configures the MAU stages 332 of the data plane 320 to implement not only the forwarding operations of these MAU stages, but also the flow tracking operations that some of these MAU stages 332 perform. These operations are performed by processing values stored in the header vectors that are generated for the data messages.

The stateful operations of the data plane are enabled by the data plane's ability to store data that it generates from processing earlier data messages for processing subsequent data messages. To perform stateful flow tracking operations, each MAU stage 332 in some embodiments includes a data plane stateful processing unit (DSPU) 510 and a set of one or more stateful tables 515, as shown in FIG. 5. As further described below, the data plane 320 in some embodiments implements the learn cache 178, the mapping table 182, the storage log 310 and the metadata storages 186 with the stateful components 510 and 515 of the MAU 332.

In addition to the DSPU 510 and stateful tables 515, the MAU stage 332 in some embodiments has a set of one or more match tables 505, an action crossbar 530, an action parameter memory 520, an action instruction memory 525, and an ALU 535. The match table set 505 can compare one or more fields in a received message's header vector (HV) to identify one or more matching flow entries (i.e., entries that match the message's HV). The match table set 505 can include TCAM tables or exact match tables in some embodiments. In some embodiments, the match table set can be accessed at an address that is a value extracted from one or more fields of the message's header vector, or it can be a hash of this extracted value. In some embodiments, the local control plane or a remote controller supplies flow entries (e.g., the flow-match identifiers and/or action identifiers), to store in one or more match tables and associated action tables.

In some embodiments, the value stored in a match table record that matches a message's flow attributes, or that is accessed at a hash-generated address from one or more message flow attributes, provides addresses of records to access in the action parameter memory 520 and action instruction memory 525. The actions performed by the MAU stage 332 can include actions that the forwarding element has to perform on a received data message to process the data message (e.g., to drop the message, or to forward the message to its destination machine or to other intervening forwarding elements). In some embodiments, these actions also include a subset of the flow-tracking operations that were described above.

Also, in some embodiments, the value stored in a match table record that matches a message's flow identifier, or that is accessed at a hash-generated address, can provide an address and/or parameter for one or more records in the stateful table set 515, and can provide an instruction and/or parameter for the DSPU 510. As shown, the DSPU 510 and the stateful table set 515 also receive a processed message's header vector. The header vectors can include instructions and/or parameters for the DSPU, while containing addresses and/or parameters for the stateful table set 515.

The DSPU 510 in some embodiments performs one or more stateful operations, while a stateful table 515 stores state data used and generated by the DSPU 510. In some embodiments, the DSPU is a set of one or more programmable ALUs that performs operations synchronously with the data flow of the message-processing pipeline (i.e., synchronously at the data line rate of the data plane 320). As such, the DSPU can process a different header vector on every clock cycle, thus ensuring that the DSPU would be able to operate synchronously with the dataflow of the message-processing pipeline.

In some embodiments, the local or remote control plane provides configuration data to program the DSPUs 510 of the MAUs 332 of the data plane 320. The DSPU 510 outputs an action parameter to the action crossbar 530. The action parameter memory 520 also outputs an action parameter to this crossbar 530. The action parameter memory 520 retrieves the action parameter that it outputs from its record that is identified by the address provided by the match table set 505. The action crossbar 530 in some embodiments maps the action parameters received from the DSPU 510 and action parameter memory 520 to an action parameter bus 540 of the action ALU 535. This bus provides the action parameter to this ALU 535. For different data messages, the action crossbar 530 can map the action parameters from DSPU 510 and memory 520 differently to this bus 540. The crossbar can supply the action parameters from either of these sources in their entirety to this bus 540, or it can concurrently select different portions of these parameters for this bus.

The action ALU 535 also receives an instruction to execute from the action instruction memory 525. This memory 525 retrieves the instruction from its record that is identified by the address provided by the match table set 505. The action ALU 535 also receives the header vector for each message that the MAU processes. Such a header vector can also contain a portion or the entirety of an instruction to process and/or a parameter for processing the instruction.

The action ALU 535 in some embodiments is a very large instruction word (VLIW) processor. The action ALU 535 executes instructions (from the instruction memory 525 or the header vector) based on parameters received on the action parameter bus 540 or contained in the header vector. The action ALU stores the output of its operation in the header vector in order to effectuate a message forwarding operation and/or stateful operation of its MAU stage 332. The output of the action ALU forms a modified header vector (HV') for the next MAU stage or the deparser. In some embodiments, examples of such actions include writing into the modified header vector the values output from the learn cache, mapping table, match table, metadata storages, etc.

In other embodiments, the match tables 505 and the action tables 515, 520 and 525 of the MAU stage 332 can be accessed through other methods as well. For instance, in some embodiments, each action table 515, 520 or 525 can be addressed through a direct addressing scheme, an indirect addressing scheme, and an independent addressing scheme. The addressing scheme that is used depends on the configuration of the MAU stage, which in some embodiments, is fixed for all data messages being processed, while in other embodiments can be different for different data messages being processed.

In the direct addressing scheme, the action table uses the same address that is used to address the matching flow entry in the match table set 505. As in the case of a match table 505, this address can be a hash generated address value or a value from the header vector. Specifically, the direct address for an action table can be a hash address that a hash generator (not shown) of the MAU generates by hashing a value from one or more fields of the message's header vector. Alternatively, this direct address can be a value extracted from one or more fields of the header vector.

On the other hand, the indirect addressing scheme accesses an action table by using an address value that is extracted from one or more records that are identified in the match table set 505 for a message's header vector. As mentioned above, the match table records are identified through direct addressing or record matching operations in some embodiments.

The independent address scheme is similar to the direct addressing scheme except that it does not use the same address that is used to access the match table set 505. Like the direct addressing scheme, the table address in the independent addressing scheme can either be the value extracted from one or more fields of the message's header vector, or it can be a hash of this extracted value. In some embodiments, not all the action tables 515, 520 and 525 can be accessed through these three addressing schemes, e.g., the action instruction memory 525 in some embodiments is accessed through only the direct and indirect addressing schemes. Also, other addressing schemes are used to address some of the tables (e.g., action tables). For instance, in some embodiments, the storage ID allocator and the storage ID log are implemented as FIFO/stack structures that are addressed through counters, as further described below.

In some embodiments, the data plane 320 repeatedly (e.g., periodically) exports collected flow metadata to the control plane 125 or to a remote device (e.g., a remote controller or server that connects to the forwarding element 300 through intervening network fabric). To do this, the data plane 320 in some embodiments includes a set of message generators that repeatedly generate messages that are fed through the data plane's ingress and egress message processing pipelines to collect flow metadata for exporting to local or remote flow monitoring processes.

The remote device that receives the flow metadata from the forwarding element 300 aggregates the metadata with other metadata received previously from the forwarding element 300 and other network forwarding elements, and stores the aggregated metadata in a storage. In some embodiments, the remote device then analyzes the aggregated metadata and generates reports based on this analysis. Also, in some embodiments, the remote device, or another device that has access to the storages that store the aggregated metadata, can process queries regarding message flows by retrieving the stored, aggregated metadata, processing (e.g., filtering, aggregating, etc.) the retrieved metadata, and providing data to respond to the queries.

To respond to the queries, the remote device generates and sends reports for display on a display screen (e.g., in a web browser). The queries can be based on any number of database dimensions/keys and/or different metrics, such as different types of flows (e.g., elephant and mice flows), source and destination machines that result in the different types of flows, congested areas of the network, congested forwarding elements, etc.

Figure 6:
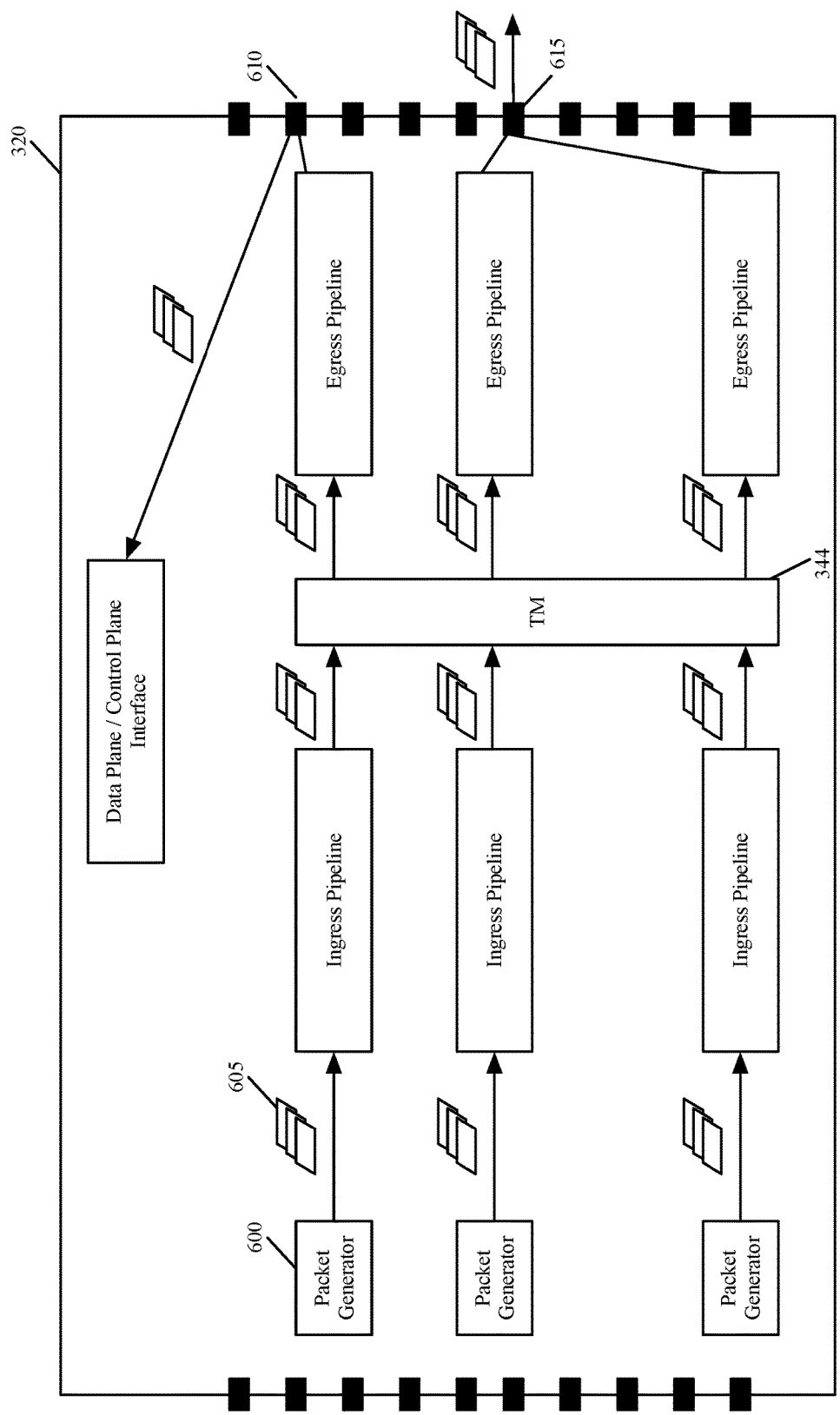
FIG. 6 illustrates examples of the message generators that are used in some embodiments to generate data messages for exporting metadata about flow learned in the data plane.

FIG. 6 illustrates examples of such message generators 600. As shown, the message generators 600 are placed in some embodiments before the ingress pipelines 340. Examples of such message generators and they placement are described in U.S. patent application Ser. No. 15/167,552, which is incorporated herein by reference. Each message generator in some embodiments iteratively generates sets of N messages 605 to collect metadata that the metadata accumulator 184 generates for the learned flows and stores in the metadata storage set 186. In some embodiments, a message generator generates N messages in a particular export iteration because this number of messages can export the desired amount of generated flow metadata for the particular export iteration. In some embodiments, each export iteration operation exports all of the generated flow metadata in a particular message processing ingress/egress pipeline, while in other embodiments, each export iteration operation exports a different subset of the generated flow metadata.

In some embodiments, a message generator produces each metadata-export message with an address that identifies a destination network address (e.g., L2-L4 address) and/or a destination egress port for the message that is associated with the destination for the message. In other embodiments, the message generator does not specify in the metadata-export message that it generates, a destination network address (e.g., L2-L4 address) and/or a destination egress port for the message, as this information is specified by a message processing stage 332 of the ingress/egress pipeline 340/342.

Each metadata-export message is associated with one or more message processing stages that include one or more metadata storages 186. A message generator in some embodiments generates each metadata-export message with a set of header values that identify some or all of the storage locations in the metadata storage set 186 to read. In other embodiments, the message generator generates each metadata-export message with other attributes from which the message processing stages 332 derive the storage locations in the metadata storage set 186 to read. For instance, in some embodiments, each generated metadata-export message has a set of header values that identify that message's position in the sequence of N generated metadata-export messages, and from this position, the message processing stages 132 derive the storage locations in the metadata storage set 186 to read.

The generated metadata-export messages are populated with flow metadata stored in one or more particular metadata storages 186 by the message processing stage or stages that include the particular metadata storage(s) 186. In other words, these message processing stage or stages retrieve the metadata from the particular metadata storage(s), and store the retrieved metadata in the header vectors associated with the generated messages that are being processed by the ingress/egress pipelines. The deparser 134 of an egress pipeline 342 then converts these header vectors into data messages that are addressed to egress ports associated with the local control plane or to a remote destination (e.g., a remote data collector).

For instance, as shown in FIG. 6, the egress pipelines 342 in some embodiments pass the metadata-export messages to another egress port 615 associated with the remote device that operates outside of the forwarding element and that executes one or more processes (e.g., flow monitoring processes) to analyze the collected flow metadata. From this egress port 615, these messages are supplied to an egress port of the forwarding element for transmission to the remote device, which may be directly connected to the forwarding element or indirectly connected to the forwarding element through intervening network fabric. In some embodiments, the traffic manager (TM) 344 selects the egress pipeline that should process the metadata-export message, and this selection then affects which data-plane egress port will receive this message.

Alternatively, the egress pipelines 342 in some embodiments pass the metadata-export messages to an egress port 610 associated with the data/control plane interface 360 when the local control plane 125 should collect these messages (e.g., to analyze the collected metadata). In some of these embodiments, the control plane 125 forwards the collected and/or analyzed metadata to a remote device through out-of-band messages (e.g., messages that are not sent through the data plane 120), or through in-band messages (e.g., messages sent through the data plane via the data/control plane interface 360). The remote device operates outside of the forwarding element and executes one or more processes (e.g., flow monitoring processes) to analyze the collected flow metadata.

To supply data-plane assigned storage identifiers for the data-plane identified message flows, some embodiments use the message generators 600 to generate messages that the message processing pipelines populated with the storage identifiers and supply to the egress port 610 for supply to the control plane 125 through the data/control plane interface 360. However, as described above, the data plane in other embodiments generates interrupt signals to the control plane whenever the control plane needs to retrieve records from the SID log 310. In these embodiments, the control plane directly retrieves these records through the data/control plane interface 360.

The data plane flow learning in some embodiments gathers metadata for each flow immediately starting from the cycle in which a flow is first identified in the data plane. The flows can be learned at data line rates without introducing any delay in the processing and forwarding of the messages to their destinations. Also, the learned data can be made available for the message that is immediately after the message that resulted in the learning of a new flow. As further described below, this availability is useful for some embodiments that perform other operations than metadata collection based on the learned flow data.

The metadata that the data plane 320 collects for a flow can include any attribute stored in the message headers (e.g., MAC addresses, five-tuple identifiers, etc.), or any number of other attributes, such as timestamps for flow learn/age events, statistics for each flow (e.g., number of processed messages in each flow, average payload size of the messages in a flow, overall size of message payloads in each flow, etc.), source and destination port numbers, etc. In some embodiments, flows are learned based on some message header attributes (i.e. IPv4/IPv6 tuples), a hash digest of the message header attributes, or a combination of the hash digest and message header attributes. When using hash digests for learning, potential digest collisions can be reduced by using a larger hash digest.

Figure 7:
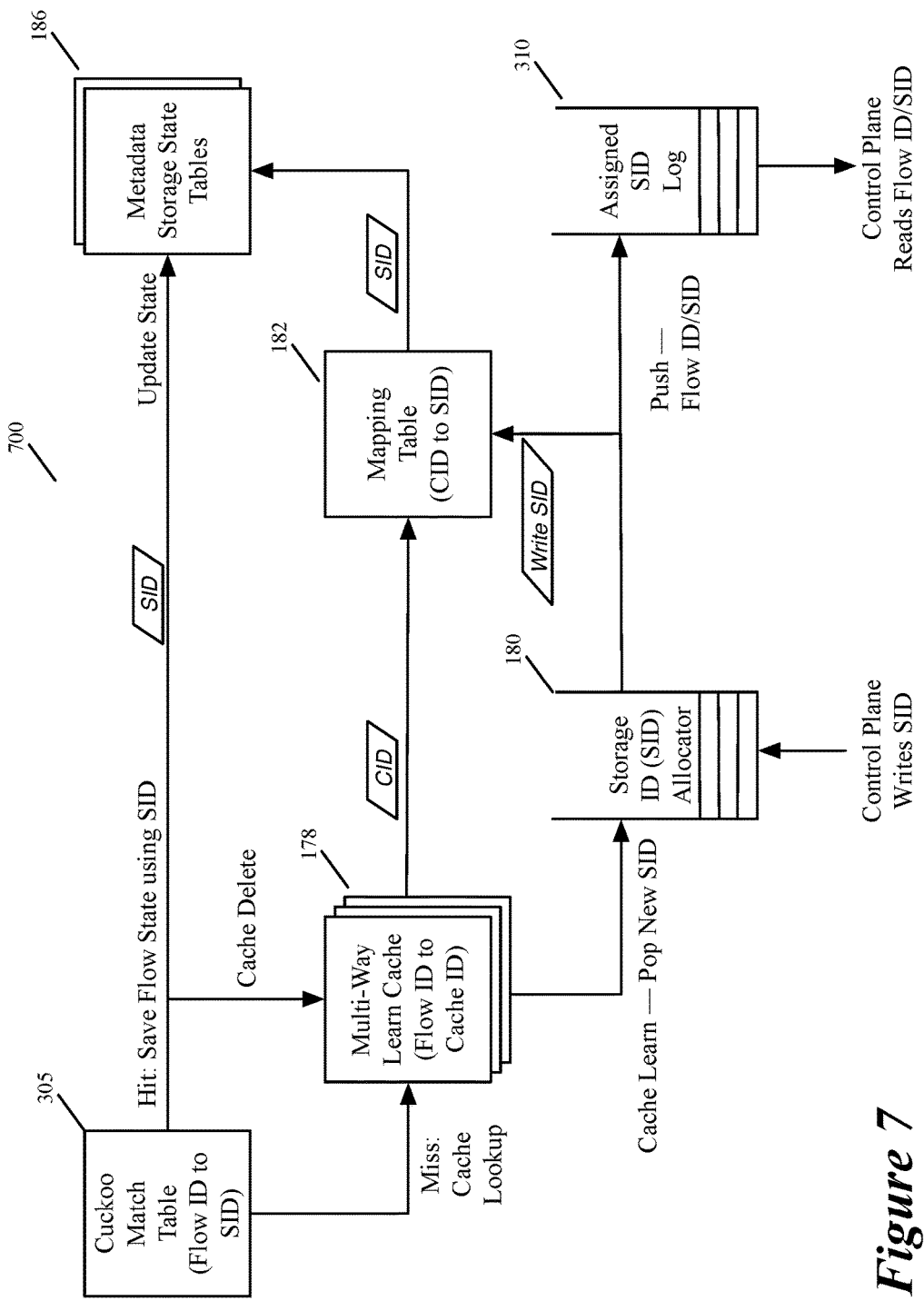
FIG. 7 presents a data flow diagram that illustrates how the flow-tracking circuit of some embodiments learns about a flow in the data plane.

FIG. 7 presents a data flow diagram 700 that illustrates how the flow-tracking circuit 370 of some embodiments learns about a flow in the data plane 320. Specifically, this diagram illustrates the data flow between a Cuckoo match table 305, a multi-way learn cache 178, a storage ID allocator 180, a storage ID log 310, and metadata storage tables 186. Each of these components corresponds to an MAU primitive that can reside in a single MAU stage or across multiple MAU stages depending on their size. One of ordinary skill in the art will realize that even though each of these components is described by reference to a specific implementation (e.g., a Cuckoo match table, a learn cache, a storage FIFO/stack for the allocator 180 and log 310, etc.), other embodiments implement these components (e.g., the match table 304, the learn cache 178, the storage ID allocator 180 and log 310, etc.) differently.

As mentioned above, flows are initially learned in the learn cache 178, which in some embodiments is a modified D-Left cache. However, through the control plane, the learned flows are moved into the Cuckoo match table 305. This frees up space in the learn cache to learn more flows. Once a flow has been moved to the Cuckoo match table 305, it's under control plane management for things like Cuckoo table moves and idle-time aging. The Cuckoo match table 305 has better packing efficiency than the modified D-Left learn cache 178, because the control plane executes Cuckoo hashing processes that tightly pack the match table with flow and metadata-storage ID records.

While records are moved in the D-Left learn cache under limited circumstances, the control plane in some embodiments can more freely move records around in the Cuckoo match table to improve packing efficiency and access efficiency (e.g., of the most frequently used records). The data plane in some embodiments has specialty move operators that assist the control plane with such move operations. The control plane management of the Cuckoo match table allows this table to store more flow and metadata-storage ID records, to reduce hash collisions and to quickly identify the metadata-storage identifiers for the most frequently processed message flows.

To reduce the required control plane intervention, some embodiments do not use the Cuckoo match table for the hardware learning in the data plane. However, this comes at the cost of MAU stages and additional resources. As Cuckoo match table 305 has better packing efficiency than the D-Left learn cache 178, there is an inherent loss in table capacity when the match table is not used in some embodiments. Also, storing all the flows in the learn cache increases the size of the storage ID allocator and the map table, as will be explained. The Cuckoo match table 305 resides in the earliest stage(s) and is managed by the control plane. Initially, this match table 305 is empty and, as flows are learned in the learn cache, the learned flows are moved by the control plane into the Cuckoo table 305 in order to free up space in the learn cache 178. An example configuration has 256K entries in the Cuckoo match table and 64K entries in the learn cache.

The Cuckoo match table 305 maps a message's flow identifier (e.g., its five tuple identifier, or a hash of its five tuple identifier) to a metadata storage ID (SID), assuming that the flow has been previously learned in the learn cache 178 and moved into the match table 305 by the control plane. When the message's flow identifier is in the Cuckoo match table (i.e., when the received message "hits" one of the records in the match table), the Cuckoo match table outputs the matching record's SID value, so that subsequent metadata storage stages 186 can use the SID to store metadata for the received message. In some embodiments in which the match table 305 is a match table of an MAU stage, the match table outputs the SID value with an instruction to its MAU's action engine to write the SID value in the message's header vector for retrieval by subsequent metadata storage stages 186.

On the other hand, when the message's flow identifier is not in the Cuckoo match table (i.e., when the received message "misses" matching any records in the match table), the match table outputs an instruction that directs the learn cache 178 to use the message's flow identifier to determine whether it has a record that shows that it has previously processed this flow identifier (i.e., that it has previously learned this message's flow). The learn cache 178 maps a message's flow identifier (e.g., its five tuple identifier, or a hash of its five tuple identifier) to a cache ID (CID), assuming that the flow has been previously learned in the learn cache 178. The CID is a map-storage identifier that is used to index the map storage 182, as further described below. In some embodiments, the learn cache is implemented by 4-stateful ALUs in the same MAU stage as the match table 305, as further described below.

When the learn cache determines that it has previously learned (processed) the received message's flow (i.e., it matches the message's flow identifier with one of its stored flow identifiers), the learn cache 178 outputs the CID value that is associated with the received message's flow identifier. In some embodiments, the output CID value is stored in the learn cache along with the matched flow identifier. In other embodiments, the learn cache dynamically generates the CID value based on the address of its record that matched the message's flow identifier (e.g., the CID value corresponds to D-way stage and address of the D-Left learn cache).

In some embodiments, the learn cache outputs the CID value by writing this value in the message's associated header vector. A subsequent MAU stage that implements the mapping storage then maps this CID value to a SID value, and stores this SID value in the message's associated header vector, so that subsequent metadata storage stages 186 can use the SID to store metadata for the received message.

When the learn cache does not match the message's flow identifier with one of its stored flow identifiers, the cache "learns" the message's flow identifier by storing the flow identifier in one record location from several candidate record locations in its multi-way storage. The learn cache also outputs a CID value on a cache learn (e.g., by generating the CID value based on the address of the record location that it uses to store the message's flow identifier and writing the CID value in the message's associated header vector).

However, on a cache learn, the learn cache also directs the storage ID allocator 180 to assign a SID value for the message's flow. To do this, the stateful ALU that implements the learn cache in some embodiments directs its action engine to mark the message's header vector to specify that a SID value needs to be specified for it by an MAU stage that implements the SID allocator 180. The SID allocator 180 then allocates a SID for the received message's flow, and provides to the mapping table 182 this SID (e.g., by writing it to the message's header vector when the SID allocator 180 and the mapping table 182 are implemented in different MAU stages, or by directly providing the SID to the mapping table 182 when it is implemented by the same MAU stage as the mapping table 182). The mapping table then stores the SID value at a location that is identified by the CID output by the learn cache.

When the SID allocator 180 outputs the SID value for a received message's flow, the assigned SID log 310 stores this SID value along with the message's flow identifier, so that the control plane can subsequently retrieve these values from the log in order to populate the match table 305. In some embodiments, the SID log 310 extracts the SID value from the message's header vector when the SID allocator and log 180 and 310 are implemented in different MAU stages. In other embodiments, these two components are implemented by the same MAU stage (e.g., the allocator 180 is implemented by a match table of the MAU stage while the log 310 is implemented by a stateful ALU), and the SID log directly receives the SID value from the SID allocator.

To create its log record, the SID log also needs the received message's flow identifier. Also, when the received message's flow identifier is a hash value, the SID log 310 extracts in some embodiments the received message's flow identifier from the header vector (e.g., when an action engine associated with the match table or learn cache wrote this flow identifier in the header vector), while in other embodiments, a hash generator in the SID log's MAU stage generates the received message's flow identifier.

In some embodiments, both the storage ID allocator and the storage ID log are configurable MAU FIFO/stack primitives that use RAM storage. For instance, in some embodiments, the SID allocator is implemented as a FIFO (first in, first out storage), while the SID log is implemented as a stack. Other embodiments implement both of these structures as FIFOs. Still other embodiments implement these structures in other ways.

The control plane initially fills the storage ID allocator with storage IDs and the storage log is empty. As flows are learned and populated in the storage ID log, the control plane removes the storage IDs and flow identifiers from the storage ID log and moves these records to the Cuckoo match table. The control plane then populates new storage IDs into the storage ID allocator. In some embodiments, the storage ID allocator and storage ID log are the size of the learn cache (e.g., 64K), but a total of 256K storage IDs will be allocated over time by the control plane to fill the Cuckoo match table.

In the embodiments that do not use the Cuckoo match table, both the allocating and returning storage IDs are handled in the dataplane.

When a flow is moved into the Cuckoo match table, it must be deleted from the learn cache. In some embodiments, the control plane does not have the CID and thus does not know where in the learn cache the entry resides. Also, the CID may change if an entry moves in the cache as will be explained. To handle this, when a flow hits in the Cuckoo match table, the match table generates a delete instruction, as shown in FIG. 7. This delete instruction directs the learn cache to search its records and invalidate any entry that it has stored for the flow identifier that has been moved to the match table.

After a flow is learned in the learn cache 178, there is some time before the control plane moves it into the Cuckoo match table 305. Typically, when the storage ID log reaches a configurable threshold, an interrupt signal is generated in the data plane to notify the control plane that there are flows ready to move. During this time, these flows will reside in the learn cache 178. As described above, when flows have a hit in the learn cache, this cache outputs CID values to the mapping table 182, which then outputs SID values at locations indexed by the CID values. The outputted SID values index the associated flow metadata state tables 186 that store metadata regarding the flow. Once a flow is moved to the Cuckoo match table along with its storage ID, it no longer uses the mapping table.

Reading from the storage ID log reduces control plane bandwidth when moving entries into the Cuckoo match table. To address this, the control plane in some embodiments splits the storage ID log into multiple tables and configures the thresholds on table boundaries. This way, when a table is full, it will not be written to again by the data plane until all of the other storage ID log tables are full. According to this approach, the control plane in some embodiments reads from the storage ID log table containing the most recently learned flows.

When the Cuckoo match table is full and there are no more storage IDs available, flows will continue to learn in the learn cache. This means that the storage ID allocator may underflow as there are no more entries in the metadata state tables 186 to store these excess flows. To handle this, the storage ID allocator FIFO in some embodiments modifies the stateful instruction to be executed on an overflow event and optionally to generate an interrupt signal. For example, the stateful instruction could be modified to issue a reserved storage ID that is then stored in the mapping table. In some embodiments, all excess flows will be issued the same storage ID, which can be used to match on in order to avoid corrupting the state tables that store the flow metadata. These excess entries will eventually age out of the learn cache. To address instances where the entries do not age out, some embodiments resubmit any message which has a reserved storage ID to invalidate its entry.

In some embodiments, both the Cuckoo match table and the learn cache are broken into several tables (called "ways"). The D-way learn cache 178 in some embodiments has one record in each way identified by a hash of a flow's identifier (e.g., a flow's five tuple). Hence, each data message can map to multiple different records in the learn cache. In some embodiments, the learn cache is organized to reduce collision probability and increase utilization. For instance, in some embodiments, this learn cache implements a modified form of D-Left hashing. With D-Left hashing, the hash table is subdivided into "D" ways, with each way having a number of entries referred to as a bucket. In some embodiments, four stateful ALUs (SALUs) exist in each MAU stage and this provides up to 4 hash ways in each MAU stage.

Figure 8:
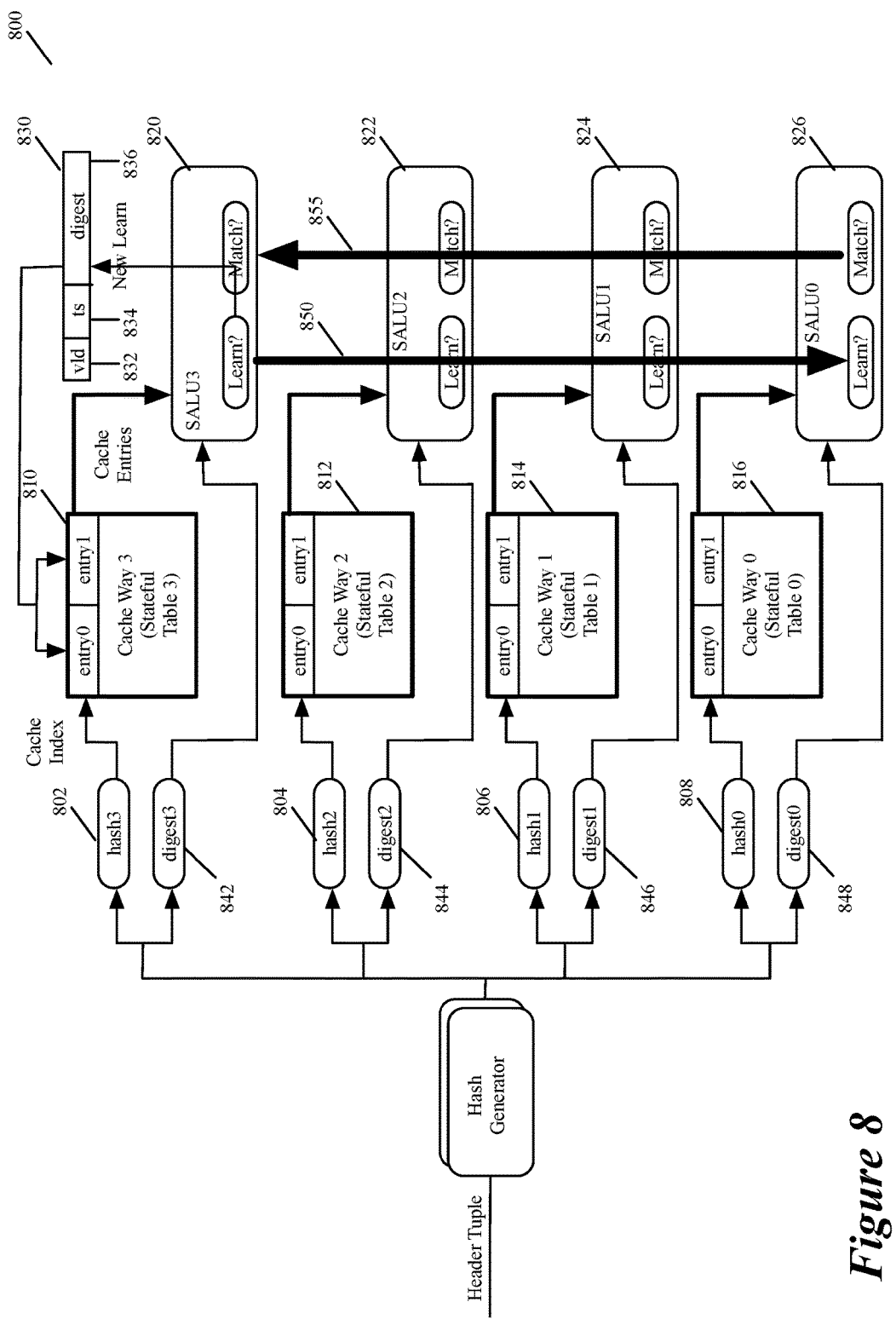
FIG. 8 provides a high-level view of a 4-way D-Left learn cache in a single MAU stage.

FIG. 8 provides a high-level view of a 4-way D-Left learn cache 800 in a single MAU stage. In some embodiments, this D-Left cache is part of a larger D-Left cache formed by multiple MAU stages, as further described below. In other embodiments, this D-Left learn cache is a single, standalone learn cache that operates on its own. As shown, the learn cache is formed by 4 stateful tables 810-816 and four stateful ALUs (SALUs) 820-826. For a received message, each stateful table outputs to its corresponding stateful ALU a multi-bit value that is stored at a location specified by one part of a hash value generated from a message's header value set (e.g., five-tuple identifier). For a received message, each stateful ALU also receives a hash digest generated from a message's header value set (e.g., five-tuple identifier). In some embodiments, the hash value and hash digest are computed from the message's header value set by one or two hash generators of the MAU stage that implements the D-Left learn cache.

When learning a new flow in the learn cache, the four SALUs in some embodiments communicate with each other so that each flow is only learned in a single cache way (i.e., in a single cache table 810-816). In some embodiments, priority scheme is fixed with the topmost SALU having the highest priority. This is different from traditional D-Left hash tables where entries are learned in the least-occupied 'way'.

For this priority scheme, the 4-way D-Left learn cache 800 employs two buses 850 and 855 that allow the 4 stateful ALU stages (formed by four pairs of a stateful table and an SALU) to share state. The first bus 850 travels downwards and provides a disable signal to disable learning at a particular SALU when any of the above SALUs indicate a 'learn' or a 'match'. The second bus 855 travels upwards and provides a disable signal to disable learning at a particular SALU when any of the below SALUs generate a 'match' to indicate that they contain the received message's hash digest.

In some embodiments, the MAU stateful ALU supports 64-bit or 128-bit D-Left hash tables. As shown, each entry 830 includes 1 valid bit 832 indicating that a learn entry is present, and a 1 to 4-bit time stamp 834 for learn cache aging. Each entry also includes a flow identifier digest 836. For a 64b D-Left table, each storage location in a cache table stores two 64-bit entries that are each candidate for learning or matching. In each 64-bit entry, the flow identifier digest includes 51 to 62 bits for matching against header vector bits or a hash digest generated from the message flow's identifier (e.g., its five-tuple). For a 128*b* cache entry, the flow identifier digest includes 123 to 126 bits for matching against header vector bits or a hash digest generated from the message flow's identifier. In some embodiments, matches for learning are not combined across multiple stateful ALUs (i.e. each stateful cache entry contains the entire field/digest to be learned). Accordingly, in some embodiments, the maximum sized entity which can be used for learning is 126 bits.

The stateful table 810-816 outputs to its SALU 820-826 a 64-bit or 128-bit entry that is stored by a record at a location specified by a hash address 802-808 that the table receives. When the valid bit in this output indicates that the entry is not empty (i.e., the entry contains a learned hash digest), the SALU then compares the hash digest stored in this entry with the hash digest 842-848 that it receives to determine if they match. If these two digests match, the SALU outputs a match along with a CID value that is based on the address of the matching record. The SALU also output a disable signal on buses 850 and 855. When the valid bit in an entry output from its stateful table indicates that the entry is empty (i.e., the entry does not contain a learned hash digest), the SALU stores the hash digest at the location of the output-entry record in its stateful table (i.e., learns the new hash digest value).

In some embodiments, a learn cache can occupy more than one MAU stage when its size cannot be accommodated by the available stateful tables of one MAU stage. In such situations, a flow that is learned in a later stage may subsequently learn in an earlier stage if a different cache entry in the earlier stage ages out (i.e., if the earlier stage cache entry later becomes available for learning after not being available for learning when the later stage had to learn about the flow). To deal with this situation, the cache entry in the later stage is invalidated and its storage ID is transferred in the mapping table 182 to the index of a new CID that is generated based on the address of the earlier stage stateful table.

Figure 9:
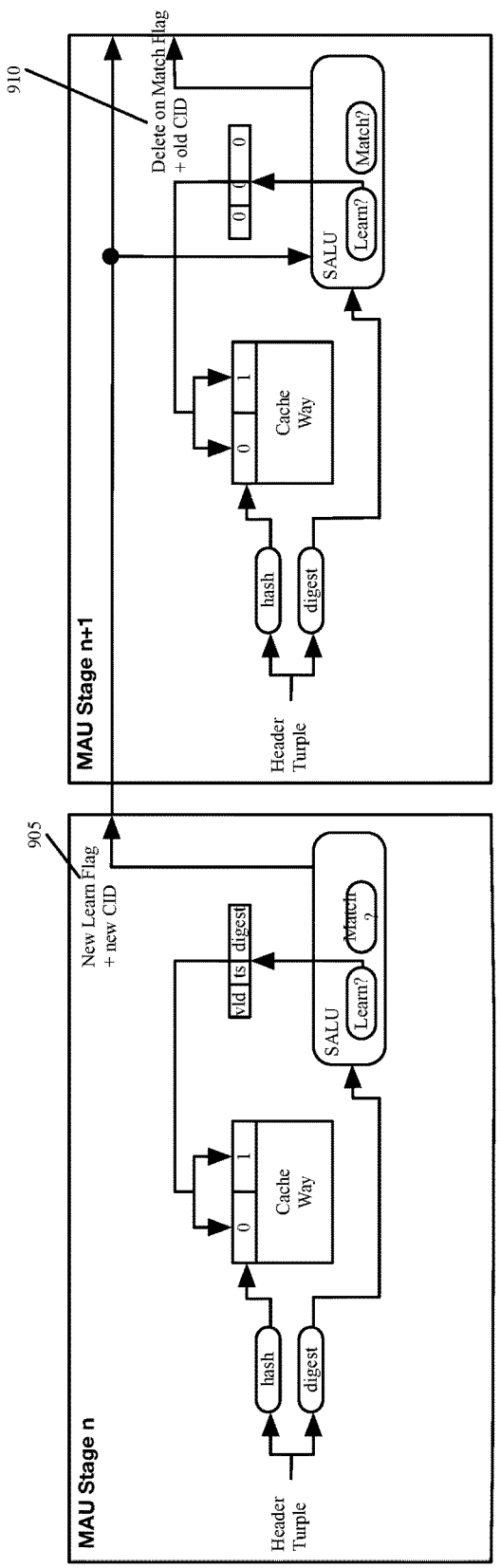
FIG. 9 illustrates how some embodiments handle a situation where a flow that is learned in a later stage is subsequently learn in an earlier stage when a different cache entry ages out.

FIG. 9 illustrates how some embodiments handle this. As shown, whenever an SALU learns a new flow, it outputs a learn flag 905 plus a new CID. The learn flag is then used to change SALU instructions in subsequent stages, so that instead of learning/matching, a later stage SALU with a cache entry that matches the received message's hash digest (1) invalidate this cache entry and (2) output the old CID plus a delete flag 910 to direct the mapping storage 182 to delete its previous record at the old CID that stored the flow's SID and to store this SID at a record indexed by the new CID. This approach ensures that a flow is only ever present in a single cache entry.

Figure 10:
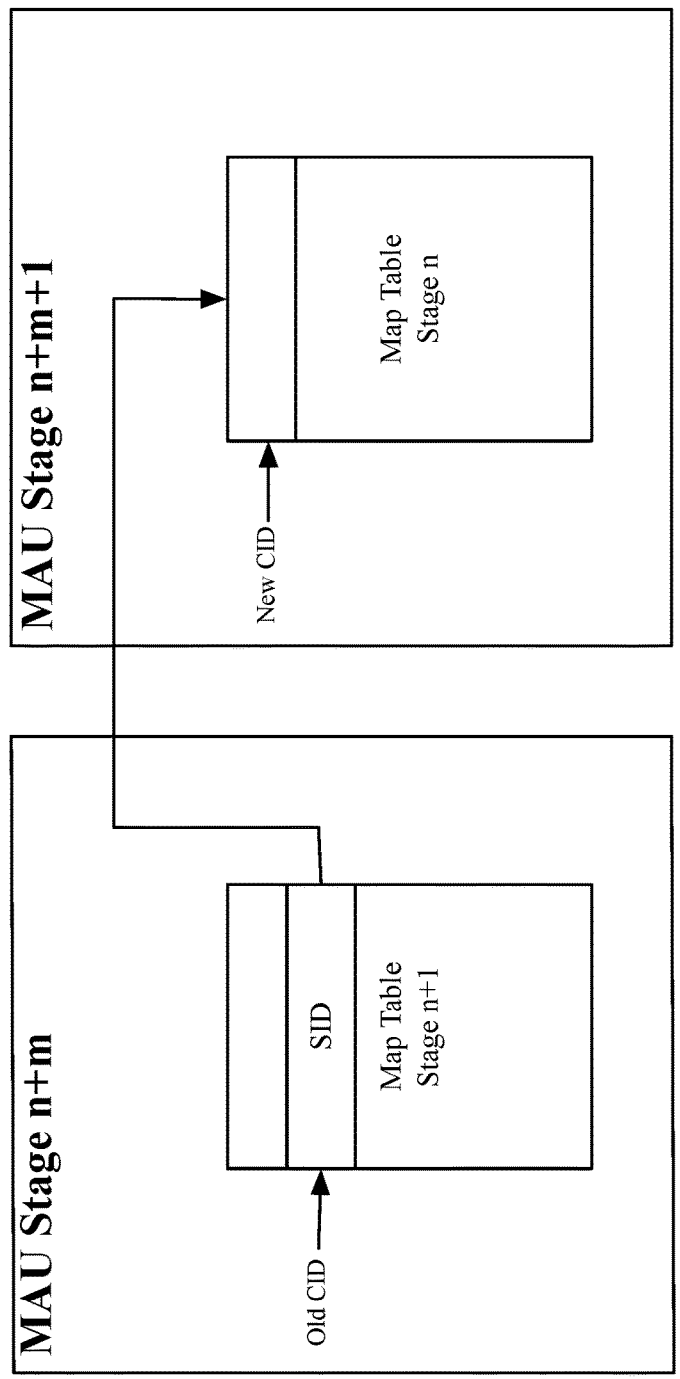
FIG. 10 illustrates a scenario where a flow is first learned in learn cache stage n, then is later learned in stage n+1 after the earlier learned entry was aged out.

Together, these two flags 905 and 910 are used in the downstream MAU stages to control the transfer of the storage ID in the mapping table. In some embodiments, there is a 1 to 1 mapping between learn cache stages and mapping table stages. In this approach, a single table does not transfer the storage ID in the mapping table. Instead, the storage ID is read from the mapping table at the index of the old CID and transferred to the next MAU stage mapping table at the new CID, as shown in FIG. 10. This figure illustrates a scenario where a flow is first learned in learn cache stage n, then is later learned in stage n+1 after the earlier learned entry was aged out. Accordingly, the storage ID is transferred to the new CID within the multi-stage mapping table. Thus, the mapping tables in some embodiments are placed in descending order across MAU stages.

Entries in some embodiments in the Cuckoo match table and the learn cache are aged out at some defined interval. In some embodiments, Cuckoo match table aging is done through idle-time tables, while the learn cache aging is performed by the SALU as this is where the timestamp is stored. In some embodiments, each time a record is accessed in the Cuckoo match time an idle-time value for that record is adjusted (e.g., reset), and each time a learn cache record is accessed the timestamp value for this record is adjusted (e.g., reset). For learn cache table, the SALU that implements the learn cache sweeps the cache records and removes/resets the records that have not been accessed for longer than a configurable time interval. Similarly, for the Cuckoo match table, the control plane retrieves idle time records (periodically or upon request), and based on these records, directs data plane modules to remove/reset the learn cache records that have not been access for longer than a configurable time interval.

Typically, the learn cache age interval will be less than the Cuckoo match table to ensure that entries that age out of the Cuckoo match table have already aged out of the learn cache. As described above (e.g., by reference to FIG. 6), a message generator in some embodiments in the data plane periodically generates messages that are passed through the data plane pipelines to increment the stored timestamps in the learn cache entries. When a timestamp for a learn cache entry in a stateful table reaches a configurable value (e.g., a maximum value for a timestamp count up, or a minimum value for a timestamp count down), its corresponding SALU invalidates the entry so a new flow can be learned at this location. In such cases, the storage ID typically has already been recycled by the control plane when the entry aged out of the Cuckoo Table.

Figure 11:
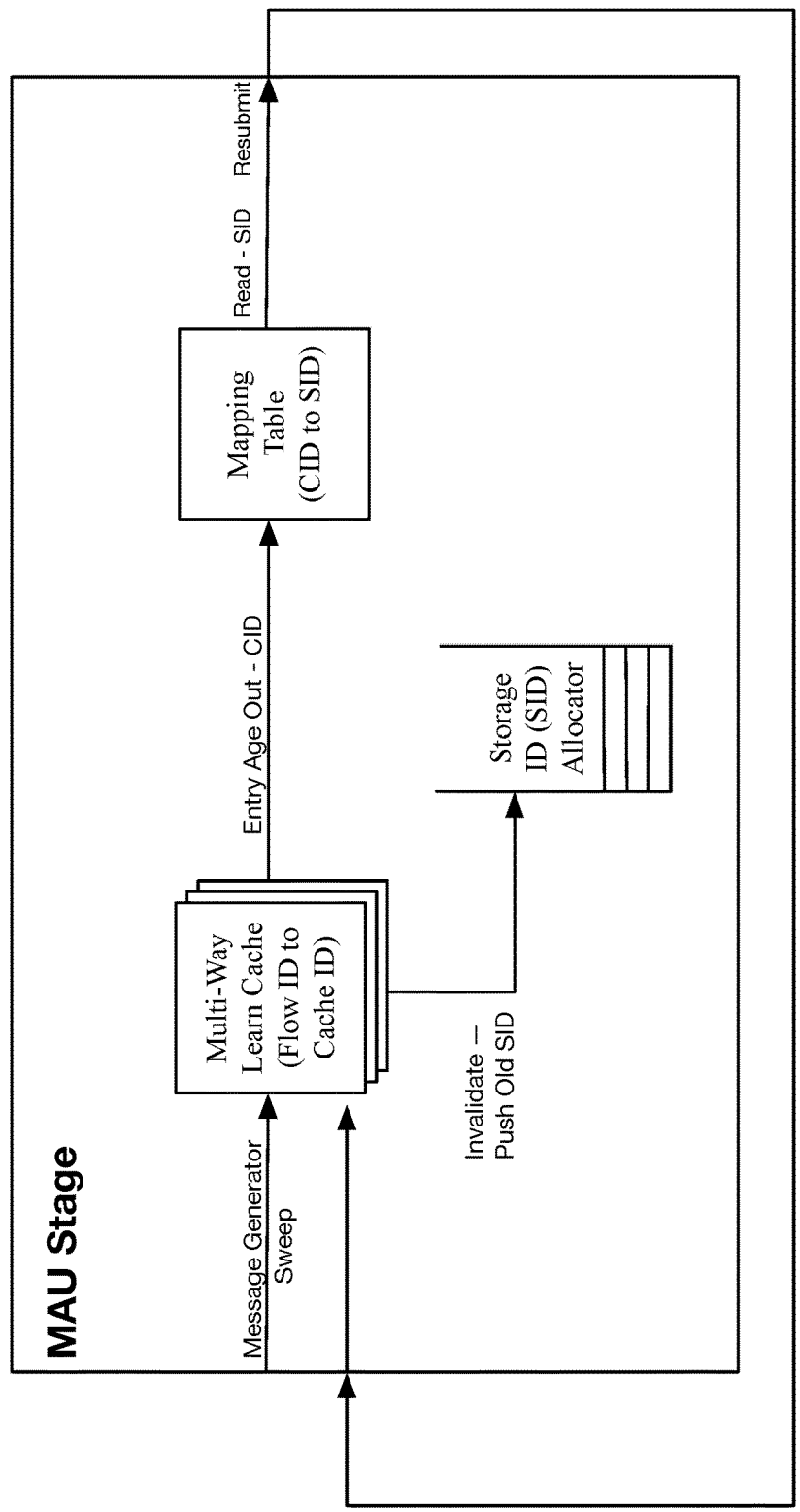
FIG. 11 illustrates how invalidating the entry and returning the storage ID is an atomic pipeline operation.

In embodiments that do not employ a cuckoo match table, the dataplane recycles the storage ID. In this case, when the timestamp for a learn cache entry in a stateful table reaches the configurable value, its corresponding SALU outputs a flag and the entry will no longer match, but is not yet invalidated. An MAU stage then uses this flag to read the storage ID from the mapping table and then directs the message to be resubmitted along with the storage ID. Upon resubmit, the entry is invalidated in the learn cache and the storage ID is pushed back into the storage ID allocator. FIG. 11 illustrates how invalidating the entry and returning the storage ID is an atomic pipeline operation.

In embodiments that do employ a cuckoo match table, the MAUs in some embodiments can perform the learn cache aging sweep similar to a meter sweep. In some embodiments, the entries are swept at a given interval for the target age rate to facilitate aging. Each time an entry is swept, its timestamp is incremented. When the timestamp reaches a configurable max, its ready to be aged out and replaced. Depending on the configuration, the entry can either invalidate itself immediately when the timestamp reaches the max, or it can wait for a special age-out instruction.

This is referred to as a stateful sweep. This removes the need for sweeps issued by the message generator, which consume pipeline bandwidth and are not effective when the messages are dropped. The stateful sweep are performed during inactive cycle in which the MAUs are not processing data messages. After a programmable threshold interval during which the MAUs have not seen any inactive cycles, the MAUs can request an inactive cycle to perform a stateful sweep. Some embodiments can also opportunistically issue stateful sweeps when a message is present, but the associated learn cache way is not executing as part of the pipeline flow. Since the stateful sweep uses pipeline inactive cycles, an age-out event cannot trigger a storage ID to be recycled in the dataplane as this needs to happen inline with message flow. Accordingly, stateful sweeps are only used in some embodiments when a Cuckoo match table fronts a learn cache.

The SALU instructions to handle hardware learning and aging are as follows:
  Match-or-Learn: This is how the SALU learns new flows using a 64b/128b ternary match. If an entry is already present, then it will match instead of learn. Both Learning and Matching output a separate flag used in downstream processing.
  Invalidate-on-Match: This is used to invalidate entries after they have moved to the Cuckoo match table or a learn cache way in an earlier MAU stage
  Invalidate-on-Age-Out: Used in 'Cache-only' learning configuration to invalidate entries upon resubmit after they've aged out of the learn cache Sweep-Age: Used in 'Cache-only' learning configuration to age cache entries. This instruction increments the timestamp and outputs a flag when it reaches the maximum.

Sweep-Age-Invalidate: Same as Sweep-Age instruction, except the entry is invalidated immediately when the timestamp reaches the maximum. Used for Cuckoo-fronted learn caches where the control plane handles recycling of flow IDs.

Some embodiments use a stateful memory to implement a FIFO data structure primitive, or a Stack data structure primitive, that is used for the storage ID allocator and storage ID log. Such primitives manage push/pop address counters to implement FIFO/stack semantics along with an associated stateful table. In some embodiments, there are separate push/pop address counters for a FIFO structure. For a stack, one counter is used which points to the head of the stack. These primitive uses stateful table instructions that can read from the table and send the values to downstream MAU stages (or the Deparser), or write data into the table. Any data that's available in the header vector or hash digest can be sent to the stateful table for a push. Each time a push/pop event occurs, the associated stateful instruction is executed.

Some embodiments manage each push/pop address counter by either the control plane or the data plane for a given configuration. Separate control plane instructions are implemented, allowing for individual push/pops as well as block-pop. Threshold levels can be set for the counters to interrupt the control plane when a certain number of entries have been pushed or popped. In this manner, the control plane can be notified when a block of entries has been pushed and can issue a block instruction to pop all the entries from the table. When managed by the data plane, the push/pop counters in some embodiments are fronted by a match table that generates push/pop events in the dataplane. In some embodiments, this can be exact match table or ternary TCAM (ternary content addressable memory) match table.

In some embodiments, RAMs from multiple MAU stages may be chained together in order to implement large FIFO/Stacks. In this case, the first stage in the chain contains the global push/pop address counters and each time a command is issued, only the stage whose address matches will execute the instruction. The address is passed between stages through the header vectors. Similarly, some embodiments chain multiple pipeline chains together in order to increase the resources of the flow-learning in the data plane.

While the invention has been described with reference to numerous specific details, one of ordinary skill in the art will recognize that the invention can be embodied in other specific forms without departing from the spirit of the invention. For instance, several of the above-described embodiments after learning of a new flow, collect metadata regarding the new flow. Other embodiments, however, perform other operations after learning in the data plane of a new flow.

Specifically, as mentioned above, the flow-identifying circuit 372 of the data plane 320 allows learned flow data to be learned in the data plane from the first message of the flow, and to have this learned data available for the message that is immediately after the message that resulted in the learning of a new flow. This availability is very useful for some embodiments that perform other operations than metadata collection based on the learned flow data. These other operations can be forwarding operations or service operations in some embodiments. These other operations can make immediate, real-time reactions to any events happening to application flows with full information.

Any and all applications that require real-time reaction on complete flow information become feasible thanks to data plane flow learning of the flow-identifying circuit 372. Flow control applications are one class of such applications. For instance, modern TCP processes heavily rely on the first couple of signaling messages (SYN and SYN-ACK) to gauge the available bandwidth and ramp up the TCP sending rate. The data plane flow learning circuit 372 can allow flow control logic implemented by forwarding element 300 (e.g., implemented by the data plane in some embodiments, or by the control plane in other embodiments) to learn each new TCP flow and compute the fair rate for the new flow and re-compute the fair rates for existing flows.

Moreover, in some embodiments, this determination can be done on an application-aware, per-flow allocations, e.g., allocating more flow rate to particular TCP destination ports and/or IP addresses. Some embodiments also apply different QoS (Quality of Service) policies based on the per-flow information. Other flow control operations include detecting an elephant flow in the data plane through flow-learning, and breaking up the elephant flow into mice flows that are sent to the destination of the original elephant flow along different paths (e.g., different ECMP routes).

Security use cases are examples of other types of applications that can benefit from the data plane flow-learning of some embodiments. For instance, some embodiments offload on to the data plane the TCP SYN Authentication procedures that some destination servers perform to guard against denial of service attacks. Some such embodiments use the data plane flow learning to quickly identify a TCP SYN message that needs to be authenticated, and then direct SYN authentication circuits in the data plane (e.g., that are implemented by the configurable MAUs of the data plane) to perform the SYN authentication process to ensure the validity of the source requesting the TCP connection.

Several of the above described embodiments implement flow learning in network forwarding elements such as switches and routers. In other embodiments, the network forwarding element that performs the flow learning are other types of forwarding elements, such as network interface cards, etc. Also, in several above-described embodiments, storage identifiers (such as map-storage identifiers and meta-data-storage identifiers) are shared between the message processing stages by recording these identifiers in header vectors processed by the processing stages. In other embodiments, these identifiers are shared between the different stages through data buses between these stages. Accordingly, one of ordinary skill in the art would understand that the invention is not to be limited by the foregoing illustrative details, but rather is to be defined by the appended claims.

The invention claimed is:

1. A network forwarding element comprising:
 a data-plane processor to process data message flows received by the network forwarding element in order to forward the data message flows; and
 a control-plane circuit to configure the data-plane processor to process the data message flows, wherein:
 the data-plane processor comprises first and second learned-flow storages to store flow identifiers of message flows that are learned by the data-plane processor; and
 the first learned-flow storage is to store the flow identifiers at storage locations specified by data-plane address generators, while the second learned-flow storage is to store the flow identifiers at storage locations specified by the control-plane circuit.

2. The network forwarding element of claim 1, wherein the second learned-flow storage is to store flow identifiers more efficiently than the first learned-flow storage is to store flow identifiers, as the control-plane circuit is to execute packing processes that specify efficient storage packing of the flow identifiers.

3. The network forwarding element of claim 1, wherein the data-plane processor comprises a flow-learning circuit to learn at least a set of the received message flows, wherein:
the flow-learning circuit is to store, in the first learned-flow storage, a particular flow identifier for a particular message flow that the flow-learning circuit learns, and is to use the particular flow identifier to process subsequent messages of the particular message flow,
after the flow-learning circuit stores the particular flow identifier in the first learned-flow storage, the control-plane circuit is to store a flow identifier for the particular message flow in the second learned-flow storage.

4. The network forwarding element of claim 1, wherein for a particular message flow, the first and second learned-flow storages are to store a same flow identifier.

5. The network forwarding element of claim 1, wherein for a particular message flow, the first and second learned-flow storages are to store different flow identifiers.

6. The network forwarding element of claim 1, wherein the data-plane processor comprises a plurality of configurable message processing stages to process data message flows received by the forwarding element in order to forward the data message flows; and
the control-plane circuit is to configure the configurable message processing stages to process the data message flows.

7. The network forwarding element of claim 6, wherein the data-plane processor further comprises a flow-learning circuit to learn at least a set of the received message flows.

8. The network forwarding element of claim 7, wherein a first set of configurable message processing stages implement the flow-learning circuit when the control-plane circuit is to configure the first set of configurable message processing stages to perform flow learning operation, and a second set of configurable message processing stages are to perform data message forwarding operations of the data-plane processor when the control-plane circuit configures the second set of configurable message processing stages to process received messages to forward the data messages.

9. The network forwarding element of claim 1, wherein the flow identifiers stored in the first and second learned-flow storages are used to identify metadata-storage identifiers (IDs) that specify storage locations to store metadata about learned flows by the data-plane processor.

10. The network forwarding element of claim 9, wherein the data-plane processor further comprises metadata-accumulating circuit to identify metadata for the learned flows by the data-plane processor and store the identified metadata in the storage locations specified by the metadata- storage identifiers.

11. The network forwarding element of claim 10, wherein the metadata-accumulating circuit is to extract metadata from messages of the learned flows and generate metadata by processing the messages of the learned flows.

12. The network forwarding element of claim 1, wherein the data-plane processor further comprises a third publishing storage to store flow identifiers for the learned flows that have flow identifiers stored in the first learned-flow storage, and
the control-plane circuit to retrieve flow identifiers from the third publishing storage to identify flows learned by the data-plane processor and specified in the first learned-flow storage, and store flow identifiers in the second learned-flow storage based on the flow identifiers retrieved from the first learned-flow storage.

13. The network forwarding element of claim 12, wherein the flow identifiers stored in the first learned-flow storage are used to identify metadata-storage identifiers (IDs) that specify storage locations to store metadata about the learned flows by the data-plane processor,
the third publishing storage to store, for at least one flow identifier, an associated metadata-storage identifier, and
the control-plane circuit to retrieve the metadata-storage identifiers along with the flow identifiers, and store the metadata-storage identifiers in the second learned-flow storage along with the flow identifiers.

14. The network forwarding element of claim 13,
wherein for a received message, the second learned-flow storage is examined to determine whether it stores a flow identifier of the received message;
wherein when the second learned-flow storage stores the flow identifier of the received message, the metadata-storage identifier for the message's flow is retrieved from the second learned-flow storage and the metadata-storage identifier is used to store metadata about the received message's flow; and
wherein when the second learned-flow storage does not store the flow identifier of the received message, the first learned-flow storage is examined to determine whether it stores a flow identifier of the received message.

15. A method for learning flows in a data plane of a network forwarding element, said data plane configured by a control plane of the forwarding element to forward data messages in a network, the method comprising:
determining whether a control-plane populated match storage in the data plane has a flow identifier that matches a flow identifier of a data message received by the data plane;
when the match storage does not have a matching flow identifier, determining whether a data-plane populated learn storage in the data plane has a flow identifier that matches the flow identifier of the data message; and
when the learn storage does not have a matching flow identifier, storing the flow identifier in a storage location of the learn storage in order to indicate that the message's flow has been learned by the data plane.

16. The method of claim 15, wherein the flow identifier of the data message comprises a set of header values of the data message.

17. The method of claim 15, wherein the flow identifier of the message comprises a hash of a set of header values of the data message.

18. The method of claim 15 further comprising providing the flow identifier stored in the learned storage to the control plane for the control plane to store in the match storage.

19. The method of claim 18 further comprising storing the flow identifier in a storage log with other message flow identifiers that are stored in the learned storage, and providing a plurality of flow identifiers stored in the storage log to the control plane for the control plane to store in the match storage.

20. The method of claim 15 further comprising associating the flow identifiers with metadata-storage identifiers that identify storage locations in the data plane for storing metadata about the flows learned in the data plane.

\* \* \* \* \*